United States Patent [19]
Yamamoto et al.

[11] Patent Number: 6,047,544
[45] Date of Patent: Apr. 11, 2000

[54] ENGINE EXHAUST GAS PURIFICATION CATALYST AND EXHAUST GAS PURIFIER

[75] Inventors: Shinji Yamamoto, Yokosuka; Satomi Etou, Tokyo; Masahiro Takaya, Yokosuka, all of Japan

[73] Assignee: Nissan Motor Co., Ltd., Yokohama, Japan

[21] Appl. No.: 09/136,932

[22] Filed: Aug. 20, 1998

[30] Foreign Application Priority Data

Aug. 20, 1997 [JP] Japan ................................ 9-223919
Jun. 1, 1998 [JP] Japan ................................ 10-151193

[51] Int. Cl.[7] ............................................. F01N 3/00
[52] U.S. Cl. ............................ 60/285; 60/276; 60/301; 60/299; 422/171; 422/177; 422/180
[58] Field of Search ........................ 60/285, 276, 277, 60/299, 301, 300, 297, 289; 422/168, 170, 171, 177, 180; 123/406.44

[56] References Cited

U.S. PATENT DOCUMENTS

| 4,253,992 | 3/1981 | Soejima et al. ..................... 252/477 |
| 5,315,824 | 5/1994 | Takeshima . |
| 5,461,857 | 10/1995 | Itou et al. ............................ 60/276 |
| 5,465,573 | 11/1995 | Abe et al. ............................ 60/274 |
| 5,642,705 | 7/1997 | Morikawa et al. .................. 123/300 |
| 5,662,869 | 9/1997 | Abe et al. ............................ 422/171 |
| 5,992,143 | 11/1999 | Manaka et al. ...................... 60/284 |

FOREIGN PATENT DOCUMENTS

| 2-56247 | 2/1990 | Japan . |
| 5-59942 | 3/1993 | Japan . |
| 6-74019 | 3/1994 | Japan . |
| 6-142457 | 5/1994 | Japan . |
| 7-102957 | 4/1995 | Japan . |
| 7-144119 | 6/1995 | Japan . |

*Primary Examiner*—Thomas Denion
*Assistant Examiner*—Binh Tran
*Attorney, Agent, or Firm*—Foley & Lardner

[57] ABSTRACT

In a catalyst unit which purifies the exhaust gas of an engine, a first layer comprising a zeolite hydrocarbon adsorbent is formed on a monolithic substrate. A catalyst layer comprising palladium, platinum or rhodium as a three way catalyst is formed on the first layer. The Geometrical Surface Area of the monolithic substrate is set in the range of 10–35 $cm^2/cm^3$. The weight ratio of the first layer and the catalyst layer is set to from 9:1 to 1:4.

31 Claims, 17 Drawing Sheets

| (A) | (B) | (C) | (D) | (E) (F) | (G) | (H) | (I) | (J) | (K) | (L) | (M) | (N) |
|---|---|---|---|---|---|---|---|---|---|---|---|---|
| SAMPLE#1 | β,MFI | 9/1 | – | 2.59 | 0.24 | BaO(10g/1) | – | 1:1 | 300/6mil | 24.1 | 1.30 | 40 |
| SAMPLE#2 | β,MFI | 11/9 | – | 2.59 | 0.24 | BaO(10g/1) | – | 1:1 | 300/6mil | 24.1 | 1.30 | 40 |
| SAMPLE#3 | β,MFI,USY | 8/1/1 | – | 2.59 | 0.24 | BaO(10g/1) | – | 1:1 | 300/6mil | 24.1 | 1.30 | 40 |
| SAMPLE#4 | β,MFI,AlPO | 8/1/1 | – | 2.59 | 0.24 | BaO(10g/1) | – | 1:1 | 300/6mil | 24.1 | 1.30 | 40 |
| SAMPLE#5 | β,MFI,SAPO | 8/1/1 | – | 2.59 | 0.24 | BaO(10g/1) | – | 1:1 | 300/6mil | 24.1 | 1.30 | 40 |
| SAMPLE#6 | β,MFI,MORDENITE | 8/1/1 | – | 2.59 | 0.24 | BaO(10g/1) | – | 1:1 | 300/6mil | 24.1 | 1.30 | 40 |
| SAMPLE#7 | β,MFI,FERRIELITE-A | 8/1/1 | – | 2.59 | 0.24 | BaO(10g/1) | – | 1:1 | 300/6mil | 24.1 | 1.30 | 40 |
| SAMPLE#8 | β,MFI | 9/1 | Pd | 2.59 | 0.24 | BaO(10g/1) | – | 1:1 | 200/10mil | 19.0 | 1.53 | 55 |
| SAMPLE#9 | β,MFI | 9/1 | P | 2.59 | 0.24 | BaO(10g/1) | – | 1:1 | 200/10mil | 19.0 | 1.53 | 55 |
| SAMPLE#10 | β,MFI | 9/1 | Ca | 2.59 | 0.24 | BaO(10g/1) | – | 1:1 | 200/10mil | 19.0 | 1.53 | 55 |
| SAMPLE#11 | β,MFI | 9/1 | Mg | 2.59 | 0.24 | BaO(10g/1) | – | 1:1 | 200/10mil | 19.0 | 1.53 | 55 |
| SAMPLE#12 | β,MFI | 9/1 | La | 2.59 | 0.24 | BaO(10g/1) | – | 1:1 | 200/10mil | 19.0 | 1.53 | 55 |
| SAMPLE#13 | β,MFI | 9/1 | B | 2.59 | 0.24 | BaO(10g/1) | – | 1:1 | 200/10mil | 19.0 | 1.53 | 55 |
| SAMPLE#14 | β,MFI | 9/1 | P,Ca,Zr,Ia | 2.59 | 0.24 | BaO(10g/1) | – | 1:1 | 200/10mil | 19.0 | 1.53 | 55 |
| SAMPLE#15 | β,MFI | 9/1 | P,Mg,Zr,Ce | 2.59 | 0.24 | BaO(10g/1) | – | 1:1 | 200/10mil | 19.0 | 1.53 | 55 |
| SAMPLE#16 | β,MFI | 9/1 | B,Ca,Ia,Ce,Nd | 2.59 | 0.24 | BaO(10g/1) | – | 1:1 | 200/10mil | 19.0 | 1.53 | 55 | g/1 : g/liter
(A) : CATALYST UNIT
(B) : ZEOLITE
(C) : COMPOSITION
(D) : SUPPORTED METAL ON SUBSTRATE
(E) : RARE METAL
(F) : Pd (g/liter)
(G) : Rh (g/liter)
(H) : ALKALINE METAL (g/liter)
(I) : ALKALINE EARTH METAL (g/liter)
(J) : WEIGHT RATIO OF ZEOLITE TO 3-WAY CATALYST
(K) : Nos. OF CELLS/THICKNESS
(L) : GSA OF SUBSTRATE (cm²/cm³)
(M) : HYDRAULIC DIAMETER (mm)
(N) : AVERAGE THICKNESS OF ZEOLITE(μm)

FIG.12

| (A) | (B) | (C) | (D) | (E) (F) | (G) | (H) | (I) | (J) | (K) | (L) | (M) | (N) |
|---|---|---|---|---|---|---|---|---|---|---|---|---|
| SAMPLE#17 | β,MFI | 9/1 | — | 2.59 | 2.24+Pt0.24 | BaO(10g/l) | — | 1:1 | 200/10mil | 19.0 | 1.53 | 55 |
| SAMPLE#18 | β,MFI | 9/1 | — | 2.59+Pt0.24 | 0.24 | BaO(10g/l) | — | 1:1 | 200/10mil | 19.0 | 1.53 | 55 |
| SAMPLE#19 | β,MFI | 9/1 | — | 2.59+Pt0.24 | 2.24+Pt0.24 | BaO(10g/l) | — | 1:1 | 200/10mil | 19.0 | 1.53 | 55 |
| SAMPLE#20 | β,MFI | 9/1 | — | 2.59 | 0.24 | — | K20 (1.0g/l) | 1:1 | 200/10mil | 19.0 | 1.53 | 55 |
| SAMPLE#21 | β,MFI | 9/1 | Ag | 2.59 | 0.24 | BaO(10g/l) | — | 1:1 | 200/10mil | 19.0 | 1.53 | 55 |
| SAMPLE#22 | β | 100% | — | Pd,Rh RESIDE IN SAME LAYER | Pd2.59+ Rh0.24 | — | — | 1:1 | 200/10mil | 19.0 | 1.53 | 55 |
| SAMPLE#23 | β | 100% | — | Pd,Rh,Pt RESIDE IN SAME LAYER | Pd2.59+Rh 0.24+Pd0.24 | BaO(10g/l) | — | 1:1 | 200/10mil | 19.0 | 1.53 | 55 |
| SAMPLE#24 | β | 100% ZIRCONIUM OXIDE+Rd | — | 2.59+Rd0.24 | 0.24 | BaO(10g/l) | — | 1:1 | 200/10mil | 19.0 | 1.53 | 55 |
| CS #1 | β,MFI | 9/1 | — | 2.59 | 0.24 | BaO(10g/l) | — | 1:1 | 900/4mil | 41.1 | 0.74 | 3 |
| CS #2 | β,MFI | 9/1 | — | 2.59 | 0.24 | BaO(10g/l) | — | 1:1 | 300/6mil | 24.1 | 1.30 | 40 |
| CS #3 | β,MFI | 9/1 | — | 2.59 | 0.24 | BaO(10g/l) | — | 10:1 | 300/5mil | 24.1 | 1.30 | 5 |
| CS #4 | β,MFI | 9/1 | — | 2.59 | 0.24 | BaO(10g/l) | — | 1:5 | 300/6mil | 24.1 | 1.30 | 40 |
| CS #5 | A | 100% | — | 2.59 | 0.24 | BaO(10g/l) | — | 1:1 | 900/6mil | 41.1 | 0.74 | 3 |
| CS #6 | USY | 100% | — | 2.59 | 0.24 | BaO(10g/l) | — | 1:1 | 900/6mil | 41.1 | 0.74 | 3 |
| CS #7 | MFI | 100% | — | 2.59 | 0.24 | BaO(10g/l) | — | 1:1 | 900/6mil | 41.1 | 0.74 | 3 |
| CS #8 | β,MFI | 9/1 | — | 2.59 | 0.24 | — | — | 1:1 | 300/6mil | 24.1 | 1.30 | 40 | g/l : g/liter
CS : COMPARATIVE SAMPLE
(A) : CATALYST UNIT
(B) : ZEOLITE
(C) : COMPOSITION
(D) : SUPPORTED METAL ON SUBSTRATE
(E) : RARE METAL
(F) : Pd (g/liter)
(G) : Rh (g/liter)
(H) : ALKALINE METAL (g/liter)
(I) : ALKALINE EARTH METAL (g/liter)
(J) : WEIGHT RATIO OF ZEOLITE TO 3-WAY CATALYST
(K) : Nos. OF CELLS/THICKNESS
(L) : GSA OF SUBSTRATE (cm²/cm³)
(M) : HYDRAULIC DIAMETER (mm)
(N) : AVERAGE THICKNESS OF ZEOLITE (μm)

FIG.13

| (A) | (B) | (C) | (D) | (E) | (F) | (G) |
| --- | --- | --- | --- | --- | --- | --- |
| SAMPLE#1 | 76 | 40 | 30 | 74 | 54 | 40 |
| SAMPLE#2 | 77 | 40 | 31 | 75 | 54 | 41 |
| SAMPLE#3 | 77 | 42 | 32 | 75 | 57 | 43 |
| SAMPLE#4 | 78 | 44 | 34 | 76 | 59 | 45 |
| SAMPLE#5 | 78 | 44 | 34 | 76 | 59 | 45 |
| SAMPLE#6 | 78 | 41 | 32 | 76 | 55 | 42 |
| SAMPLE#7 | 80 | 44 | 35 | 78 | 59 | 46 |
| SAMPLE#8 | 79 | 42 | 33 | 77 | 57 | 44 |
| SAMPLE#9 | 78 | 43 | 34 | 76 | 58 | 44 |
| SAMPLE#10 | 77 | 42 | 32 | 75 | 57 | 43 |
| SAMPLE#11 | 77 | 44 | 34 | 75 | 59 | 45 |
| SAMPLE#12 | 77 | 44 | 34 | 75 | 59 | 45 |
| SAMPLE#13 | 78 | 43 | 34 | 76 | 58 | 44 |
| SAMPLE#14 | 78 | 43 | 34 | 76 | 58 | 44 |
| SAMPLE#15 | 78 | 44 | 34 | 76 | 59 | 45 |
| SAMPLE#16 | 79 | 44 | 35 | 77 | 59 | 46 |

(A) : CATALYST UNIT
(B) : HC ADSORPTION RATE (%) ECE(0-40sec.)
(C) : PURIFICATION RATE OF ADSORBED HC(%)
(D) : REDUCTION RATE OF COLD HC(%)
(E) : PURIFICATION RATE OF ADSORBED HC(%) LA-4 A bag (0-60sec.)
(F) : PURIFICATION RATE OF ADSORBED HC (%)
(G) : REDUCTION RATE OF COLD HC (%)

FIG.14

| (A) | (B) | (C) | (D) | (E) | (F) | (G) |
|---|---|---|---|---|---|---|
| SAMPLE#17 | 76 | 43 | 33 | 74 | 58 | 43 |
| SAMPLE#18 | 76 | 42 | 32 | 74 | 57 | 42 |
| SAMPLE#19 | 76 | 41 | 31 | 74 | 55 | 41 |
| SAMPLE#20 | 76 | 42 | 32 | 74 | 57 | 42 |
| SAMPLE#21 | 78 | 43 | 34 | 76 | 58 | 44 |
| SAMPLE#22 | 75 | 40 | 30 | 73 | 54 | 39 |
| SAMPLE#23 | 76 | 40 | 30 | 74 | 54 | 40 |
| SAMPLE#24 | 76 | 42 | 32 | 74 | 57 | 42 |
| CS#1 | 70 | 11 | 8 | 68 | 15 | 10 |
| CS#2 | 76 | 21 | 16 | 74 | 28 | 21 |
| CS#3 | 75 | 20 | 15 | 73 | 27 | 20 |
| CS#4 | 59 | 37 | 22 | 57 | 50 | 28 |
| CS#5 | 29 | 32 | 9 | 27 | 43 | 12 |
| CS#6 | 66 | 34 | 22 | 64 | 46 | 29 |
| CS#7 | 54 | 35 | 19 | 52 | 47 | 25 |
| CS#8 | 76 | 18 | 14 | 74 | 24 | 18 |

CS  : COMPARATIVE SAMPLE
(A) : CATALYST UNIT
(B) : HC ADSORPTION RATE (%) ECE(0-40sec.)
(C) : PURIFICATION RATE OF ADSORBED HC(%)
(D) : REDUCTION RATE OF COLD HC(%)
(E) : PURIFICATION RATE OF ADSORBED HC(%) LA-4 A bag (0-60sec.)
(F) : PURIFICATION RATE OF ADSORBED HC (%)
(G) : REDUCTION RATE OF COLD HC (%)

FIG.15

| (A) | (B) | (C) | (D) | (E) (F) | (G) (H) | (I) | (J) | (K) | (L) | (M) | (N) |
|---|---|---|---|---|---|---|---|---|---|---|---|
| SAMPLE#25 | — | — | — | 11.30 | — | — | — | 600/4mil | 34.5 | 0.93 | — |
| SAMPLE#26 | — | — | — | 9.42 | 0.54 0.94 | — | — | 600/4mil | 34.5 | 0.93 | — |
| SAMPLE#27 β | | 100% | — | 8.48 2.83 | — | BaO(10g/l) | 2:1 | 200/10mil | 19.0 | 1.53 | 110 |
| SAMPLE#28 β,MFI,USY, Y,MORDENITE | 10/2/2/1/1 | | — | 8.48 2.83 | — | BaO(10g/l) | 2:1 | 200/10mil | 19.0 | 1.53 | 110 |
| SAMPLE#29 β | | 100% | Ba0.5 Ca0.1 | 8.48 2.83 | — | BaO(10g/l) | 2:1 | 200/10mil | 19.0 | 1.53 | 110 |
| SAMPLE#30 β,MFI,USY | 6/1/1 | | P0.5 Mg0.1-β<br>B0.5 Ca0.1-MFI<br>P0.5 Ca0.1-USY | 8.48 2.83 | — | BaO(10g/l) | 3:1 | 200/10mil | 19.0 | 1.53 | 110 |
| SAMPLE#31 β | | 100% | Pd1.0 P0.5 | 0.08 2.83 | — | BaO(10g/l) | 2:1 | 200/10mil | 19.0 | 1.53 | 110 |
| SAMPLE#32 β,MFI,USY, MORDENITE | 5/1/2/1 | | Pd0.28P0.3Mg0.1<br>Ca0.1-β<br>Pt0.33 Ca00.1-MFI<br>Pd0.28P0.2-USY<br>Pt0.33Ba0.1Mg0.1-<br>MORDENITE | 8.87 | 1.41 0.60 | BaO(10g/l) | 2:1 | 200/10mil | 19.0 | 1.53 | 110 | g/l : g/liter
(A) : CATALYST UNIT
(B) : ZEOLITE
(C) : COMPOSITION
(D) : SUPPORTED METAL ON SUBSTRATE
(E) : RARE METAL
(F) : Pd (g/liter)
(G) : Rh (g/liter)
(H) : Pt(g/liter)
(I) : ALKALINE METAL (g/liter)
(J) : WEIGHT RATIO OF ZEOLITE TO 3-WAY CATALYST
(K) : Nos. OF CELLS/THICKNESS
(L) : GSA OF SUBSTRATE ($cm^2/cm^3$)
(M) : HYDRAULIC DIAMETER (mm)
(N) : AVERAGE THICKNESS OF ZEOLITE($\mu m$)

FIG.16

| (A) | (B) | (C) | (D) | (F) | (E)(G) | (H) | (I) | (J) | (K) | (L) | (M) | (N) |
|---|---|---|---|---|---|---|---|---|---|---|---|---|
| SAMPLE#33 | β | 100% | – | 21.19 | 0.42 | 0.14 | BaO(10g/liter) | – | 900/2 mil | 43.6 | 0.78 | 5 |
| SAMPLE#34 | β | 100% | – | 2.59 | 0.24 | – | BaO(10g/liter) | 2.5/1 | 200/10mil | 19.0 | 1.53 | 145 |
| CS#9 | β | 100% | – | 8.48 | 2.83 | – | BaO(10g/liter) | 2:1 | 600/2 mil | 13.0 | 1.53 | 10 |
| CS#10 | β | 100% | – | 8.48 | 2.83 | – | BaO(10g/liter) | 2:1 | 900/4 mil | 19.0 | 1.53 | 3 |
| CS#11 | β | 100% | – | 8.48 | 2.83 | – | BaO(10g/liter) | 1:5 | 200/10mil | 19.0 | 1.53 | 11 |
| CS#12 | β | 100% | – | 8.48 | 2.83 | – | BaO(10g/liter) | 10:1 | 200/10mil | 19.0 | 1.53 | 100 |
| CS#13 | β | 100% | – | 1.02 | 0.28 | – | BaO(10g/liter) | 2:1 | 200/10mil | 19.0 | 1.53 | 100 |
| CS#14 | – | – | – | 2.59 | 0.24 | – | BaO(10g/liter) | – | 900/2 mil | 43.6 | 0.78 | 5 |

CS : COMPARATIVE SAMPLE
(A) : CATALYST UNIT
(B) : ZEOLITE
(C) : COMPOSITION
(D) : SUPPORTED METAL ON SUBSTRATE
(E) : RARE METAL
(F) : Pd (g/liter)
(G) : Rh (g/liter)
(H) : Pt (g/liter)
(I) : ALKALINE METAL (g/liter)
(J) : WEIGHT RATIO OF ZEOLITE TO 3-WAY CATALYST
(K) : Nos. OF CELLS/THICKNESS
(L) : GSA OF SUBSTRATE (cm²/cm³)
(M) : HYDRAULIC DIAMETER (mm)
(N) : AVERAGE THICKNESS OF ZEOLITE(μm)

FIG.17

| (A) | (B) | (C) | (D) | (E) | (F) | (G) | (H) | (I) | (J) | (K) | (L) | (M) |
|---|---|---|---|---|---|---|---|---|---|---|---|---|
| SAMPLE#35 | A | 33 | NONE | 30 | 32 | NONE | 77 | 48 | 37 | 75 | 60 | 45 |
| SAMPLE#36 | A | 33 | IGNITION TIMING RETARDATION 10° | 25 | 28 | NONE | 77 | 50 | 39 | 75 | 63 | 47 |
| SAMPLE#37 | A | 33 | IGNITION TIMING RETARDATION 10° | 25 | 29 | LEAN AIR-FUEL RATIO | 78 | 52 | 41 | 76 | 65 | 49 |
| SAMPLE#38 | B | 33 | NONE | 30 | 30 | SECONDARY AIR 100liter/min. | 78 | 54 | 43 | 77 | 68 | 52 |
| SAMPLE#39 | B | 33 | IGNITION TIMING RETARDATION 10° | 25 | 31 | SECONDARY AIR 150liter/min. | 78 | 54 | 43 | 77 | 58 | 52 |
| SAMPLE#40 | B | 33 | SECONDARY AIR 200liter/min. | 25 | 32 | SECONDARY AIR 50liter/min. | 78 | 51 | 40 | 76 | 64 | 48 |
| SAMPLE#41 | C | 25 | IGNITION TIMING RETARDATION 10° | 15 | 27,27 | NONE | 82 | 50 | 41 | 80 | 63 | 50 |
| SAMPLE#42 | C | 25 | IGNITION TIMING RETARDATION 15° | 15 | 28,34 | SECONDARY AIR 100liter/min. | 83 | 57 | 47 | 81 | 71 | 58 |
| SAMPLE#43 | C | 25 | IGNITION TIMING RETARDATION 15° | 15 | 28,34 | NONE | 82 | 52 | 43 | 80 | 65 | 52 |

(A) : CATALYST UNIT
(B) : DEVICE
(C) : 3-WAY CATALYST
(D) : ADDITIONAL MEASURES FOR CATALYST ACTIVATION
(E) : HC ADSORPTION RATE TO ADSORPTION CAPACITY(%)
(F) : HC ADSORBENT
(G) : ADDITIONAL MEASURES FOR DESORBED HC PURIFICATION
(H) : HC ADSORPTION RATE (%) ECE (0-40sec.)
(I) : PURIFICATION RATE OF ADSORBED HC(%)
(K) : PURIFICATION RATE OF ADSORBED HC(%) LA-4 A-bag (0-60sec.)
(L) : PURIFICATION RATE OF ADSORBED HC(%)
(M) : REDUCTION RATE OF COLD HC(%)

FIG.18

| (A) | (B) | (C) | (D) | (E) | (F) | (G) | (H) | (I) | (J) | (K) | (L) | (M) |
|---|---|---|---|---|---|---|---|---|---|---|---|---|
| SAMPLE#44 | D | 25 | NONE | 15 | 30,34 | SECONDARY AIR 100liter/min. | 82 | 57 | 47 | 80 | 71 | 57 |
| SAMPLE#45 | D | 25 | IGNITION TIMING RETARDATION 15° | 15 | 31,34 | SECONDARY AIR 100liter/min. | 83 | 59 | 49 | 81 | 74 | 60 |
| SAMPLE#46 | D | 25 | IGNITION TIMING RETARDATION 15° | 15 | 32,34 | SECONDARY AIR 100liter/min. | 84 | 59 | 50 | 82 | 74 | 60 |
| SAMPLE#47 | E | 25 | SECONDARY AIR 200liter/min. | 10 | 31,34 | NONE | 85 | 64 | 54 | 85 | 80 | 55 |
| SAMPLE#48 | E | 26 | IGNITION TIMING RETARDATION 10° | 10 | 32,34 | LEAN AIR-FUEL RATIO | 85 | 64 | 54 | 83 | 80 | 66 |
| SAMPLE#49 | E | 26 | IGNITION TIMING RETARDATION 10° | 10 | 27,34,34 | NONE | 86 | 54 | 46 | 83 | 68 | 57 |
| SAMPLE#50 | E | 26 | IGNITION TIMING RETARDATION 10° | 10 | 34,34,34 | SECONDARY AIR 100liter/min. | 86 | 54 | 55 | 84 | 80 | 67 |
| SAMPLE#51 | F | 26 | IGNITION TIMING RETARDATION 10° | 10 | 34,34,34 | SECONDARY AIR 150liter/min. | 86 | 64 | 55 | 84 | 80 | 67 |

(A) : CATALYST UNIT
(B) : DEVICE
(C) : 3-WAY CATALYST
(D) : ADDITIONAL MEASURES FOR CATALYST ACTIVATION
(E) : HC ADSORPTION RATE TO ADSORPTION CAPACITY (%)
(F) : HC ADSORBENT
(G) : ADDITIONAL MEASURES FOR DESORBED HC PURIFICATION
(H) : HC ADSORPTION RATE (%) ECE (0-40sec.)
(I) : PURIFICATION RATE OF ADSORBED HC (%)
(K) : PURIFICATION RATE OF ADSORBED HC (%) LA-4 A-bag (0-60sec.)
(L) : PURIFICATION RATE OF ADSORBED HC (%)
(M) : REDUCTION RATE OF COLD HC (%)

FIG.19

| (A) | (B) | (C) | (D) | (E) | (F) | (G) | (H) | (I) | (J) | (K) | (L) | (M) |
|---|---|---|---|---|---|---|---|---|---|---|---|---|
| SAMPLE#52 | F | 25 | SECONDARY AIR 200liter/min. | 10 | 34,34,34 | SECONDARY AIR 50liter/min. | 86 | 62 | 52 | 84 | 78 | 65 |
| SAMPLE#53 | F | 25 | IGNITION TIMING RETARDATION 10° | 10 | 34,34,34 | LEAN AIR-FUEL RATIO | 86 | 54 | 46 | 84 | 68 | 57 |
| SAMPLE#54 | F | 25 | IGNITION TIMING RETARDATION 10° | 10 | 34,34,34 | NONE | 86 | 62 | 53 | 84 | 78 | 65 |
| CS#15 | A | 25 | NONE | 90 | 27(0.3liter) | NONE | 72 | 25 | 18 | 70 | 34 | 24 |
| CS#16 | A | CS#14 | NONE | 80 | 27 | NONE | 68 | 9 | 6 | 0 | 12 | 0 |
| CS#17 | A | CS#14 | IGNITION TIMING RETARDATION 10° | 75 | 27(0.5liter) | NONE | 70 | 15 | 11 | 68 | 20 | 14 |
| CS#18 | B | 33 | IGNITION TIMING RETARDATION 10° | 25 | CS#9 | SECONDARY AIR 150liter/min. | 77 | 17 | 13 | 75 | 23 | 17 |
| CS#19 | B | 33 | IGNITION TIMING RETARDATION 10° | 25 | CS#10 | SECONDARY AIR 150liter/min. | 78 | 12 | 9 | 75 | 16 | 12 |

CS : COMPARARIVE SAMPLE
(A) : CATALYST UNIT
(B) : DEVICE
(C) : 3-WAY CATALYST
(D) : ADDITIONAL MEASURES FOR CATALYST ACTIVATION
(E) : HC ADSORPTION RATE TO ADSORPTION CAPACITY(%)
(F) : HC ADSORBENT
(G) : ADDITIONAL MEASURES FOR DESORBED HC PURIFICATION
(H) : HC ADSORPTION RATE (%) ECE (0-40sec.)
(I) : PURIFICATION RATE OF ADSORBED HC(%)
(J) : PURIFICATION RATE OF ADSORBED HC(%) LA-4 A-bag (0-60sec.)
(K) : PURIFICATION RATE OF ADSORBED HC(%)
(L) : PURIFICATION RATE OF ADSORBED HC(%)
(M) : REDUCTION RATE OF COLD HC(%)

FIG.20

| (A) | (B) | (C) | (D) | (E) | (F) | (G) | (H) | (I) | (J) | (K) | (L) | (M) |
|---|---|---|---|---|---|---|---|---|---|---|---|---|
| CS#20 | B | 33 | IGNITION TIMING RETARDATION 10° | 80 | CS#11 | SECONDARY AIR 150liter/min. | 46 | 24 | 11 | 44 | 32 | 14 |
| CS#21 | B | 33 | IGNITION TIMING RETARDATION 10° | 25 | CS#12 | SECONDARY AIR 150liter/min. | 78 | 11 | 9 | 76 | 15 | 11 |
| CS#22 | B | 33 | SECONDARY AIR 200liter/min. | 30 | CS#13 | SECONDARY AIR 150liter/min. | 77 | 34 | 26 | 75 | 46 | 34 |
| CS#23 | C | 33 | IGNITION TIMING RETARDATION 10° | 30 | CS#13, CS#13 | NONE | 78 | 37 | 29 | 76 | 50 | 38 |
| CS#24 | D | 33 | IGNITION TIMING RETARDATION 10° | 25 | CS#10, CS#10 | SECONDARY AIR 150liter/min. | 77 | 38 | 29 | 75 | 51 | 38 |
| CS#25 | E | 33 | IGNITION TIMING RETARDATION 10° | 30 | CS#13, CS#13, CS#13 | NONE | 80 | 41 | 33 | 78 | 55 | 43 |
| CS#26 | F | 33 | IGNITION TIMING RETARDATION 10° | 20 | CS#10, CS#10 | SECONDARY AIR 150liter/min. | 79 | 42 | 33 | 77 | 57 | 44 |

CS: COMPARATIVE SAMPLE
(A) : CATALYST UNIT
(B) : DEVICE
(C) : 3-WAY CATALYST
(D) : ADDITIONAL MEASURES FOR CATALYST ACTIVATION
(E) : HC ADSORPTION RATE TO ADSORPTION CAPACITY (%)
(F) : HC ADSORBENT
(G) : ADDITIONAL MEASURES FOR DESORBED HC PURIFICATION
(H) : HC ADSORPTION RATE (%) ECE (0-40sec.)
(I) : PURIFICATION RATE OF ADSORBED HC (%)
(K) : PURIFICATION RATE OF ADSORBED HC (%) LA-4 A-bag (0-60sec.)
(L) : PURIFICATION RATE OF ADSORBED HC (%)
(M) : REDUCTION RATE OF COLD HC (%)

FIG.21

ENGINE EXHAUST GAS PURIFICATION CATALYST AND EXHAUST GAS PURIFIER

FIELD OF THE INVENTION

This invention relates to purification of hydrocarbons at an engine start-up.

BACKGROUND OF THE INVENTION

A three-way catalyst using rare metals such as rhodium (Rh), platinum (Pt) and palladium (Pd) is known for purifying the exhaust gas of an engine.

The three way catalyst makes exhaust gas harmless by reducing nitrogen oxides (NOx) and oxidizing carbon monoxide (CO) and hydrocarbons (HC).

However, the three way catalyst is not activated sufficiently if the temperature of the exhaust gas does not rise to some extent, and it cannot then exhibit its real purification performance.

Exhaust gas contains many hydrocarbons (HC) when the engine starts.

Tokkai Hei 2-56247 published by the Japanese Patent Office in 1990, discloses a catalyst unit comprising a second layer of a three-way catalyst having a rare metal as its main component formed on a first layer of zeolite with HC adsorbing properties as its main component.

In this catalyst unit, the zeolite adsorbs HC at a low temperature, and the desorbed HC from the zeolite is oxidized by the three-way catalyst which is activated by the rise of exhaust gas temperature.

However, the oxygen concentration in the exhaust gas decreases when the HC desorbs from the zeolite.

Consequently, in such an environment where the oxygen concentration has decreased, the three-way catalyst cannot exhibit its full performance which it exhibits at the stoichiometric air-fuel ratio.

Tokkai Hei 5-59942 published in 1993, Tokkai Hei 6-74019, 6-142457 published in 1994, and Tokkai Hei 7-144119, 7-102957 published in 1995 by the Japanese Patent Office, disclose a method wherein HC at low temperature is adsorbed on a HC adsorbent, and desorbed after the three-way catalyst is activated.

However, according to this prior art device, it was necessary to control the activation time of the three-way catalyst, and necessary to instal special equipment such as a bypass passage for hot gas and a heat exchanger to warm up the three-way catalyst.

In addition, it was necessary to use a large amount of rare metals so that the three-way catalyst which oxidizes the HC desorbed from the HC adsorbent, continues to have a high oxidizing performance in the long term.

SUMMARY OF THE INVENTION

It is therefore an object of this invention to improve the HC treatment ability and the durability of a catalyst unit comprising a zeolite HC adsorbent and a three-way catalyst.

It is a further object of this invention to improve the HC oxidizing performance of the three-way catalyst while suppressing the amount of rare metals used.

In order to achieve the above objects, this invention provides a catalyst unit for purifying the exhaust gas of an engine, comprising a monolithic substrate having a Geometrical Surface Area in the range 10–35 $cm^2/cm^3$, a first layer comprising a zeolite hydrocarbon adsorbent formed on the monolithic substrate, and a catalyst layer comprising any one of palladium, platinum and rhodium as a three-way catalyst, the catalyst layer being formed on the first layer, and the weight ratio of the first layer to the catalyst layer lying in the range of 9:1 to 1:4.

It is preferable that the zeolite comprises beta-zeolite.

It is further preferable that the beta-zeolite comprises H type beta-zeolite whereof the Si-2Al ratio is in the range of 10 to 500.

It is still further preferable that the hydrocarbon adsorbent further comprises any one of MFI type zeolite, Y type zeolite, USY type zeolite, mordenite, ferrierite, A type zeolite, X type zeolite, $AlPO_4$ and SAPO.

It is also preferable that the hydrocarbon adsorbent further comprises any one of mordenite, Y type zeolite, USY type zeolite and MFI type zeolite in the range of 5 weight % to 45 weight %.

It is also preferable that tile first layer further comprises any one of palladium (Pd), magnesium (Mg), calcium (Ca), strontium (Sr), barium (Ba), silver (Ag), yttrium (Y), lanthanum (La), cerium (Ce), neodymium (Nd), phosphorus (P), boron (B) and zirconium (Zr).

It is also preferable that the catalyst layer further comprises zirconium oxide which comprises 1–40 mole % of any one of rhodium (Rh), cerium (Ce), neodymium (Nd) and lanthanum (La) expressed as the metal.

It is also preferable that the catalyst layer further comprises alumina which comprises 1–10 mole % of any one of cerium (Ce), zirconium (Zr) and lanthanum (La) expressed as the metal, and cerium oxide which comprises 1–40 mole % of any one of zirconium (Zr), neodymium (Nd) and lanthanum (La) expressed as the metal.

It is also preferable that the catalyst layer comprises a second layer comprising palladium (Pd) as a three-way catalyst and a third layer formed on the second layer comprising rhodium (Rh) as a three way catalyst.

In this case, it is preferable that the third layer further comprises 1–40 mole % of any one of cerium (Ce), neodymium (Nd) and lanthanum (La).

It is also preferable that the catalyst layer further comprises platinum (Pt).

It is also preferable that the weight ratio of the first layer and the catalyst layer is in the range of 5:1 to 1:2.

It is also preferable that the monolithic substrate comprises any one of an alkali metal and an alkaline earth metal.

It is also preferable that the number of cells of the monolithic substrate is set in the range of 50–600.

It is also preferable that the hydraulic diameter of the monolithic substrate is set in the range of 0.75–5 mm.

It is also preferable that the total thickness of the first layer and the catalyst layer is set in the range of 30–400 $\mu$m.

It is also preferable that the amount of hydrocarbon absorbed by the first layer is set equal to or less than 70% of the hydrocarbon saturation absorption amount.

It is also preferable that the hydrocarbon adsorbent further comprises any one of platinum, palladium, phosphorus, boron, magnesium and calcium.

It is also preferable that the hydrocarbon adsorbent further comprises palladium, and the catalyst layer comprises a layer of cerium oxide comprising 1–40 mole % of any one of zirconium, neodymium and lanthanum expressed as the metal, and 60–98 mole % of cerium.

It is also preferable that the hydrocarbon adsorbent further comprises palladium, and the catalyst layer comprises a layer comprising zirconium oxide and active alumina, the zirconium oxide comprising 1–30 mole % of any one of platinum, rhodium, cerium, neodymium and lanthanum, and 70–98 mole % of zirconium.

This invention also provides an exhaust purification device for purifying the exhaust gas of an engine, comprising a first catalyst unit comprising a monolithic substrate having a Geometrical Surface Area in the range 10–35 $cm^2/cm^3$, a first layer comprising a zeolite hydrocarbon adsorbent formed on the monolithic substrate, and a catalyst layer comprising any one of palladium, platinum and rhodium as a first three-way catalyst, the catalyst layer being formed on the first layer, and the weight ratio of the first layer to the catalyst layer lying in the range of 9:1 to 1:4, and a second catalyst unit installed upstream of the first catalyst unit, second catalyst unit supporting any one of palladium, platinum and rhodium as a second three-way catalyst, wherein a support concentration of the second three-way catalyst is set in the range of 4–20 weight %, and the support amount of the second three-way catalyst is set in the range of 100–1000 $g/ft^3$, wherein the amount of hydrocarbon absorbed by the first layer is set equal to or less than 70% of the hydrocarbon saturation adsorption amount of the hydrocarbon adsorbent.

It is also preferable that the concentration of the second three-way catalyst is set in the range of 4 weight % to 15 weight %, and the support amount of the second three-way catalyst is set in the range of 100–500 $g/ft^3$.

It is also preferable that the device further comprises an ignition timing controller which retards an ignition timing of the engine by 1 to 30 degrees from top dead center for 40 seconds from engine startup.

It is also preferable that the device further comprises an air-fuel ratio controller which maintains an intake air amount of the engine at 10 liters/min or more and controls an air-fuel ratio of the engine to lie in the range of 12 to 18 for 60 seconds from engine startup.

It is also preferable that the device further comprises a mechanism for supplying either oxygen or air upstream of or inside the first catalyst unit immediately before hydrocarbons are desorbed from the hydrocarbon absorbent.

In this case, it is further preferable that the device further comprises a temperature sensor for detecting a temperature upstream of the first catalyst unit, an oxygen sensor for detecting an oxygen concentration in the exhaust gas downstream of the first catalyst unit, and a controller for controlling the mechanism so that the oxygen concentration detected by the oxygen sensor is equal to or greater than a value corresponding to a stoichiometric air-fuel ratio when the temperature detected by the temperature sensor is equal to or greater than a predetermined temperature.

It is still further preferable that the predetermined temperature is set to 110° C.

It is also preferable that the device further comprises a temperature sensor for detecting a temperature inside the first catalyst unit, an oxygen sensor for detecting an oxygen concentration in the exhaust gas downstream of the first catalyst unit, and a controller for controlling the mechanism so that the oxygen concentration detected by the oxygen sensor is equal to or greater than a value corresponding to a stoichiometric air-fuel ratio when the temperature detected by the temperature sensor is equal to or greater than a predetermined temperature.

It is also preferable that the device further comprises a first oxygen sensor for detecting an oxygen concentration in the exhaust gas upstream of the first catalyst unit, a second oxygen sensor for detecting an oxygen concentration in the exhaust gas downstream of the first catalyst unit, and a controller for determining desorption of hydrocarbons from the hydrocarbon absorbent based on the output of the first and second oxygen sensors, and controlling the mechanism so that the oxygen concentration detected by the second oxygen sensor is equal to or greater than a value corresponding to a stoichiometric air-fuel ratio during desorption of hydrocarbons.

It is also preferable that the device further comprises a catalyst unit identical to the first catalyst unit and installed downstream of the first catalyst unit.

This invention also provides an exhaust purification device for purifying the exhaust gas of an engine, comprising a first catalyst unit comprising a monolithic substrate having a Geometrical Surface Area in the range 10–35 $cm^2/cm^3$ a first layer comprising a zeolite hydrocarbon adsorbent formed on the monolithic substrate, and a catalyst layer comprising rhodium as a first three-way catalyst, the catalyst layer being formed on the first layer, and the weight ratio of the first layer to the catalyst layer lying in the range of 9:1 to 1:4 and a second catalyst unit installed upstream of the first catalyst unit, the second catalyst unit supporting rhodium as a second three-way catalyst, wherein a support concentration of the second three-way catalyst is set in the range of 4–20 weight %, the support amount of the second three-way catalyst is set in the range of 100–1000 $g/ft^3$, wherein the amount of hydrocarbon absorbed by the first layer is set equal to or less than 70% of the hydrocarbon saturation adsorption amount of the hydrocarbon adsorbent, and an amount of rhodium as the second three-way catalyst is set less than the amount of rhodium as the first three-way catalyst.

The details as well as other features and advantages of this invention are set forth in the remainder of the specification and are shown in the accompanying drawings.

BRIEF DESCRIPTION OF THE DRAWINGS

FIG. 12 is a table showing specifications of the catalyst unit of Samples #1–#16 according to this invention.

FIG. 13 is a table showing specifications of the catalyst unit of Samples #17–#24 according to this invention, and Comparative Samples #1–#8 for the purpose of comparison.

FIG. 14 is a table showing an HC treatment ability of the catalyst unit of the Samples #1–#16.

FIG. 15 is a table showing the HC treatment ability of the catalyst unit of the Samples #17–#24 and the Comparative Samples #1–#8.

FIG. 16 is a table showing specifications of the catalyst unit of Samples #25–#32 according to this invention.

FIG. 17 is a table showing specifications of Samples #33 and #34 according to this invention and Comparative Samples #9–#14 for the purpose of comparison.

FIG. 18 is a table showing specifications and HC treatment abilities of Samples #35–#43 of the exhaust purification device according to the invention.

FIG. 19 is a table showing specifications and HC treatment abilities of Samples #44–#51 of the exhaust purification device according to this invention.

FIG. 20 is a table showing specifications and HC treatment abilities of Samples #52–#54 according to this invention and Comparative Samples #15 –#19 of the exhaust purification device for the purpose of comparison.

FIG. 21 is a table showing specifications and HC treatment abilities of Comparative Samples #20–#26 for the purpose of comparison.

DESCRIPTION OF THE PREFERRED EMBODIMENTS

Figure 1:
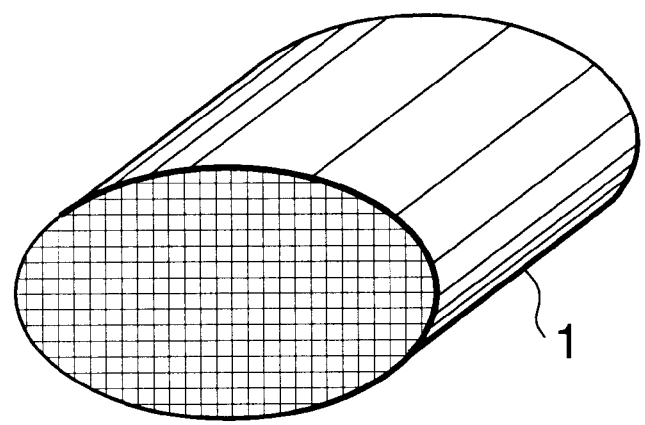
FIG. 1 is a perspective view of a catalyst unit according to this invention.
Figure 2:
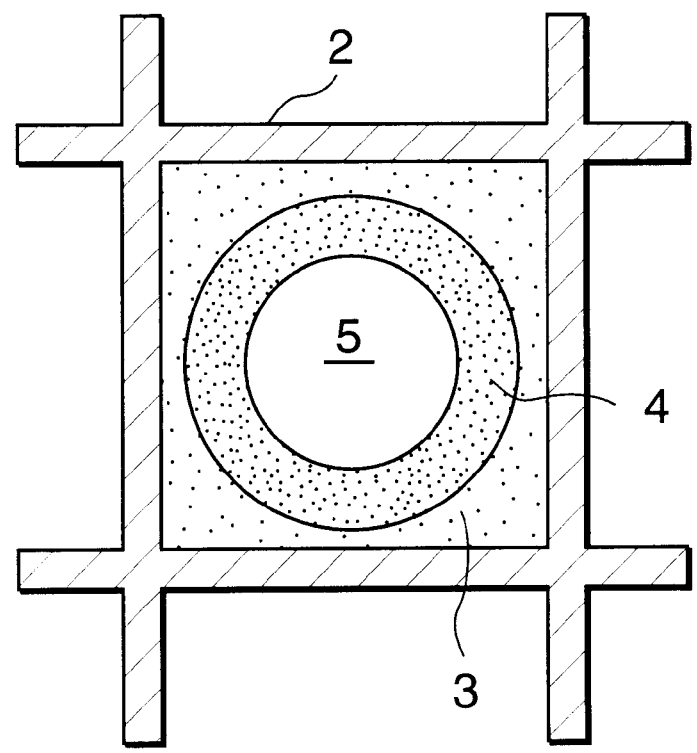
FIG. 2 is an enlarged cross-sectional view of a cell of the catalyst unit.

Referring to FIG. 1 and FIG. 2 of the drawings, a catalyst unit 1 for exhaust gas purification according to this invention is provided with a first layer 3 which comprises an HC adsorbent formed on a monolithic substrate 2 which has a grid shape cross-section, and a catalyst layer 4 of ring-shaped cross-section formed on the first layer.

The exhaust gas circulates through a passage 5 formed in the catalyst layer 4.

The HC adsorbent comprises at least one kind of zeolite including beta-zeolite. which is effective for adsorbing HC, as its main component.

The catalyst layer 4 further comprises a second layer and an inner third layer.

The second layer contains palladium (Pd) as a three-way catalyst, and the third layer contains rhodium (Rh) as a three-way catalyst.

The palladium (Pd) and rhodium (Rh) can be mixed together in the second layer instead of providing the third layer.

These are generically referred to as "the catalyst layer" in the following description.

The weight ratio of the first layer 3 and catalyst layer 4 is set in the range of 9:1 to 1:4.

When the catalyst layer is thicker than this range, the exhaust gas does not diffuse easily into the zeolite in the first layer, and the ability to adsorb HC decreases. Conversely, when the catalyst layer is thinner than this range, the performance of the catalyst layer in oxidizing HC which are desorbed from the adsorbent is insufficient.

Still more preferably, the aforesaid ratio is set in the range of 5:1 to 1:2.

When palladium (Pd) and rhodium (Rh) are mixed in the second layer without providing the third layer, the weight ratio of the zeolite in the first layer and the second layer is set in this range.

In this catalyst unit 1, after the aforesaid layers are formed on the monolithic substrate 2, at least one type of metal or metal compound chosen from alkali metal or alkaline earth metals is impregnated in the layers.

Specifically, this corresponds to at least one of the metals lithium (Li), sodium (Na), potassium (K), cesium (Ce), magnesium (Mg), calcium (Ca), strontium (Sr), barium (Ba) or their compounds.

The alkali metal or alkaline earth metal compound may be a water-soluble compound such as the oxide, acetate, or hydroxide. In this way, the alkali metal or alkaline earth metal which is a basic element can be put into a desirable state of dispersion in the vicinity of the rare metal.

For impregnation, the catalyst unit with the 1st–3rd layers is impregnated with a solution in which a powder of the alkali metal or alkaline earth metal compound is dissolved, and is then dried. The product is fired at 200–600° C. in air or a current of air.

When the firing temperature is lower than this range, the alkali metal or alkaline earth metal compound is not sufficiently oxidized. On the other hand, if it is higher than this range, a more desirable effect is not achieved.

The content of the alkali metal or the alkaline earth metal compound is set to be 1–40 g per liter of catalyst.

Below this range, poisoning of the catalyst due to adsorption of HC and sintering of precious metals cannot be controlled. Moreover, if this range is exceeded, a significant increase is not achieved, and the performance of the catalyst actually decreases.

To effectively adsorb a large amount of discharged HC on engine startup, the zeolite in the first layer preferably has two different pore diameters and its main component is H type beta-zeolite having Si/2Al in the range of 10–500.

This kind of beta-zeolite is more heat resistant and structurally stable compared to other zeolites.

Moreover, as two pore diameters are provided, the HC molecular diameters that can be adsorbed is spread over a wider range than in other zeolites.

When Si/2Al is leas than 10, water molecules in the exhaust gas tend to interfere with HC adsorption.

On the other hand, when Si/2Al is larger than 500, an amount of HC adsorbed by the first layer decreases.

In addition, MFI type zeolite, Y type zeolite, USY type zeolite, mordenite. ferrierite, A type zeolite, X type zeolite, $AlPO_4$ or SAPO is added to the H type beta-zeolite in the first layer.

These zeolites all have a different pore distribution, so by selectively combing these zeolites with beta-zeolite, a composition ratio having a desirable HC adsorption ability is obtained.

In addition, as well as zeolite, any of the elements magnesium (Mg), calcium (Ca), strontium (Sr), barium (Ba), silver (Ag), yttrium (Y), lanthanum (La), cerium (Ce), neodymium (Nd), phosphorus (P), boron (B) or zirconium (Zr) may be added to the first layer.

These substances are supported on the first layer by the ion exchange method, impregnation method or steeping method.

As a result, the HC adsorption properties, desorption suppression ability and the durability of the zeolite can be improved.

It is also desirable to add platinum (Pt) to the second layer or third layer. The reason for adding platinum (Pt) together with palladium (Pd) or rhodium (Rh) is that it confers improved tolerance to poisoning. As raw material compounds, water-soluble compounds such as dinitrodiamine salts, chlorides and nitrates are used.

In addition, it is desirable that the first layer contains zirconium oxide also comprising any of the elements rhodium (Rh), cerium (Ce), neodymium (Nd) or lanthanum (La) to the extent of 1–40 mole % expressed as the metal.

As a result, the oxidizing performance with respect to oxidizing desorbed HC can be further improved.

It is preferable for the second layer to contain alumina. Alumina improves structural stability of the layer after long-term high temperature. Also, to suppress the phase transition to alpha-alumina and the decrease of BET specific surface area, any of the elements cerium (Ce), zirconium (Zr) or lanthanum (La) are added to the extent of 1–10 mole % expressed in terms of the metal.

At less than 1 mole %, a sufficient addition effect is not obtained, and at more than 10 mole %, no greater effect is obtained.

Moreover, the amount of this alumina is 10–200 g per liter of catalyst. At less than 10 g, rare metals do not sufficiently diffuse, and at more than 200 g, no greater effect is achieved.

In addition to the aforesaid catalyst components, cerium oxide is added to the second layer.

The cerium oxide comprises 1–40 mole % of any of zirconium (Zr), neodymium (Nd) or lanthanum (La) expressed in terms of the metal, and 60–99% of cerium (Ce) expressed in terms of the metal.

This cerium oxide has a high oxygen occlusion ability, and when the oxygen concentration in the exhaust gas is less than a value corresponding to the stoichiometric air-fuel ratio, or is in the vicinity of the stoichiometric air-fuel ratio corresponding value, the lattice oxygen and adsorbed oxygen are discharged, and the rare metals are maintained in an oxidizing state suitable for exhaust gas purification.

The reason why 1–40 mole % of zirconium (Zr) neodymium (Nd), or lanthanum (La) is added is that the oxygen discharge ability or BET specific surface of $ZrO_2$, and the heat stability of the catalyst, are conspicuously improved due to this.

When these elements are contained to the extent of less than 1 mole % the effect is the same as if none at all were added, whereas if their quantity exceeds 40 mole %, the effect is the same as if less than 40 mole % were added and may even be negative.

The rare metal starting material compounds of the 2nd and 3rd layers may be any water-soluble compounds such as dinitrodiamines, chlorides or nitrates.

The water may be removed by, for example, any of the methods known in the art such as filtration or evaporation to dryness. There is no particular limitation on the initial heat treatment for obtaining the rare metal carrier powder, however to disperse the added rare metal well, firing at the relatively low temperature of 400–800° C. in air or a current of air is preferable.

Although the catalyst of each layer obtained in this way is effective without a substrate it is preferable to crush it, make a slurry, coat it on a substrate and fire it at 400–900° C.

The first layer is formed by the following method. A silica sol is added to a zeolite powder having beta-zeolite as its main component, and crushed in a wet process to obtain a slurry. The slurry is made to adhere to a catalyst substrate and is then fired in air or a current of air at 400–650° C.

The second layer is formed by the following method. An alumina sol is added to a powder of Pd on a carrier alumina powder and cerium oxide powder, and crushed in a wet process to obtain a slurry. The slurry is made to adhere to the first layer and is then fired in air or a current of air at 400–650° C.

The third layer is formed by the following method. An alumina sol is added to a powder carrying Rh, alumina powder and cerium oxide powder, and crushed in a wet process to obtain a slurry. The slurry is made to adhere to the second layer and is then fired in air or a current of air at 400–650° C.

The catalyst substrate is a cordierite material, but metal materials such as ferrite type stainless steel can be used. The catalyst component powder may also be formed into a grid shape or honeycomb shape. The geometrical surface area (GSA) of the substrate is arranged to be 10–35 $cm^2/cm^3$. Due to this, contact between the zeolite layer and exhaust gas is limited, and desorption from the zeolite layer of adsorbed HC is delayed. When the GSA is larger than this range, HC desorption from the zeolite layer is expedited, and discharge of unoxidized HC increases. When the GSA is smaller than this range, there is less opportunity for exhaust gas and the catalyst layer to come in contact, and the exhaust purifying ability of the catalyst layer falls.

It is desirable that the number of cells in the substrate is 50–600. Due to this, contact between the zeolite layer and exhaust gas is limited, and desorption from the zeolite layer of adsorbed HC is delayed.

The hydraulic diameter of the substrate is arranged to be 0.75–5 mm. The diffusion rate, of exhaust gas into the zeolite layer is thereby reduced, and desorption of adsorbed HC from the zeolite layer is delayed. Hydraulic diameter refers to the length of a diagonal of a cell of the substrate.

It is preferable that the coating amount of all catalyst components adhering to the substrate is 50–600 g per liter of substrate. From the viewpoint of catalyst activity and lifetime, it is preferable that the three-way catalyst component carrier layer is thick, but if the three-way catalyst coating layer is too thick, diffusion of exhaust gas into the zeolite layer is difficult, and adsorption of HC by the zeolite layer declines.

From the viewpoint of HC desorption delay, it is preferable that the zeolite component supporting layer is thick, but if the zeolite coating layer is too thick, contact between the desorbed HC and the catalyst is poor, and the ability to oxidize desorbed HC falls. On this account, it is desirable to set the coating weight ratio of zeolite and three-way catalyst to between 5:1 and 1:2.

It is preferable that the thickness of the coating layer of the flat part in the cell is 30–400 $\mu$m. By setting the GSA of the substrate supporting the Catalyst components, cell number and hydraulic diameter to within the predetermined ranges, it is ensured that the zeolite layer has sufficient thickness to delay HC desorption from the zeolite, and the ability to oxidize desorbed HC is maintained at a high level.

In order to improve the adsorption performance of various kinds of hydrocarbons discharged in the low temperature region, the first layer can contain mordenite, Y type zeolite, USY type zeolite and MFI type zeolite to the extent of 5–45 weight %.

When the amount is less than 5 weight %, the distribution of the aforesaid two pore diameters is inadequate, and when the amount exceeds 45 weight %, no greater effect is obtained and the HC adsorption ability of the beta-zeolite actually decreases.

To improve structural stability and heat resistance of the first layer, to improve HC adsorption performance in the low temperature region and to enhance suppression of HC desorption when the temperature rises, the first layer may contain any of the elements platinum (Pt), palladium (Pd), phosphorus (P), boron (B), magnesium (Mg) or calcium (Ca). These are contained in the range of from 0.1 weight % to 10 weight % relative to the HC adsorbent. When the content is less than 1 weight % there is no effect, and when it is greater than 10 weight %, the pores in the zeolite are blocked so that HC adsorption falls.

To improve HC oxidation when the HC in the HC adsorbent of the first layer is desorbed, the second layer may contain cerium oxide containing zirconium (Zr), neodymium (Nd) or lanthanum (La) to the extent of 1–40 mole % expressed as the metal, and 60–98 mole % of cerium. The cerium oxide which has a high oxygen occlusion ability makes it easier to release lattice oxygen or adsorbed oxygen when oxygen is insufficient or the exhaust gas has the stoichiometric air-fuel ratio. As a result the oxidation state of palladium (Pd) is rendered suitable for purifying the exhaust gas, and deterioration of the catalyst performance of palladium (Pd) is suppressed. The amount of cerium oxide used is 5–100 g per liter of catalyst. When the amount of cerium oxide is less than 5 g, the dispersion of precious metals is inadequate, while if it is greater than 100 g, no greater effect is obtained.

To improve the resistance of palladium (Pd) to poisoning and improve its purifying performance, the second layer may contain a catalyst layer comprising zirconium oxide containing platinum (Pt), rhodium (Rh), cerium (Ce), neodymium (Nd) or lanthanum (La) to the extent of 1–30 mole % expressed as the metal, and 70–98 mole % of zirconium (Zr) together with active alumina.

Zirconium oxide is used as a base material for supporting platinum (Pt) and rhodium (Rh) as it improves the durability of platinum (Pt) and rhodium (Rh).

The zirconium oxide which has a high oxygen occlusion ability makes it easier to release lattice oxygen or adsorbed oxygen when oxygen is insufficient or the exhaust gas has the stoichiometric air-fuel ratio. As a result the oxidation states of platinum (Pt) and rhodium are rendered suitable for purifying the exhaust gas, and deterioration of the catalyst performance is suppressed.

The amount of cerium in the zirconium oxide is from 0.01 mole % to 30 mole %. When the amount of cerium is less than 0.01 mole %, there is no difference from when none is added and the effect due to the oxygen occlusion ability of cerium-containing zirconium oxide is not manifested.

When the amount of cerium is greater than 30 mole %, no greater effect is obtained, and the BET specific surface area and heat stability of cerium oxide ($CeO_2$) actually decrease.

The amount of zirconium oxide used is 5–100 g per liter of catalyst.

When this amount is less than 5 g, the dispersibility of rare metals is insufficient, and if it is more than 100 g, no greater effect is obtained.

The palladium (Pd) may also contain potassium (K) or barium (Ba) to enhance the activity of palladium (Pd) at low temperature. The amount of these materials is in the range of 1–40 g per liter of catalyst.

When the amount is less than 1 g, adsorption poisoning of rare metals by HC is not alleviated and sintering of palladium (Pd) is not suppressed.

When the amount is greater than 40 g, no greater effect is obtained and the performance actually decreases.

Next, a second embodiment of this invention will be described.

In the catalyst unit according to this embodiment, the catalyst layer comprising palladium (Pd), platinum (Pt) or rhodium (Rh) is formed on the HC adsorbent material having zeolite as its main component.

In this catalyst unit, the catalyst layer is not divided into a second and third layer as it was in the first embodiment.

To obtain a good balance between the HC adsorption efficiency of the zeolite layer and the HC oxidizing performance of the three-way catalyst, the weight ratio of the zeolite layer and catalyst layer is set to be in the range of 5:1 to 1:2. When the proportion of the catalyst layer is less than 5:1, the ability of the three-way catalyst to oxidize desorbed HC is poor, and when it is greater than 1:2, the HC adsorption ability of the HC adsorbent is insufficient.

It is preferable that the amount of beta-zeolite used is in the range of 10–400 g per liter of catalyst.

When the amount is less than 10 g, HC adsorption ability is insufficient, and when it is more than 400 g, there is no improvement of adsorption ability or of the desorption delay effect and costs rise.

To delay desorption of HC adsorbed by the zeolite layer, the zeolite layer and three-way catalyst are supported on a monolithic carrier having a GSA of 10–35 $cm^2/cm^3$.

When the GSA is less than 10 $cm^2/cm^3$, diffusion of HC into the zeolite layer is delayed and a high adsorption performance is not obtained.

On the other hand when the GSA is greater than 35 $cm^2/cm^3$, desorption of adsorbed HC is expedited and the amount of unpurified HC which is discharged increases.

As this catalyst unit uses beta-zeolite which has a high heat resistance for the HC adsorbent, it maintains a high HC adsorption efficiency from when it is first used to end of life. It also delays desorption of adsorbed HC, and as the three-way catalyst is formed in a one-piece construction on the HC adsorbent, heat losses are less and the three-way catalyst becomes active earlier than if the HC adsorbent and catalyst layer are separate.

HC oxidizing efficiency is also high, as the HC desorbed from the HC adsorbent comes into full contact with the three-way catalyst.

Figure 3:
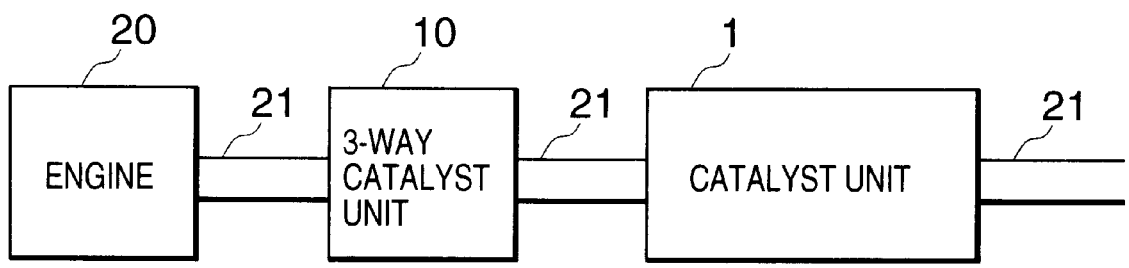
FIG. 3 is a schematic diagram of an exhaust purification device according to a third embodiment of this invention.

Next, a third embodiment of this invention will be described referring to FIG. 3.

This embodiment relates to the exhaust purification device used in the catalyst unit 1 of the aforesaid first embodiment. This exhaust purification device comprises the catalyst unit 1 of the first embodiment and the three-way catalyst unit 10 comprising palladium (Pd), platinum (Pt) or rhodium (Rh) installed upstream. Specifically, the three-way catalyst unit 10 is provided upstream of an exhaust pipe 21 of an engine 20, and the catalyst unit 1 is provided downstream.

When the HC adsorbent in the catalyst unit 1 adsorbs all the HC in the exhaust gas at the low temperature after engine startup, and desorption of HC starts due to rise of catalyst temperature, the three-way catalyst in the second or third layer becomes oxygen-deficient over a long period of time. As a result, the capacity for oxidizing desorbed HC drops remarkably.

Therefore, a three-way catalyst unit 10 comprising palladium (Pd), platinum (Pt) or rhodium (Rh) which have good HC oxidizing performance in the low temperature region, is installed upstream of the catalyst unit 1 that uses HC adsorbent.

A powder containing 4 weight % to 20 weight % of Pd (Pt, Rh) is supported in the three-way catalyst unit 10.

The support amount of Pd (Pt, Rh) is also set to from 100 g/ft$^3$ (3.5 g/liter) to 1000 g/ft$^3$ (35.4 g/liter). The amount of HC adsorbed by the HC adsorbent in the catalyst unit 1 before catalyst activation is set equal to or less than 70% of the HC saturation absorption amount of HC adsorbent. If the amount of HC adsorbed by the HC adsorbent before catalyst activation exceeds 70% of the HC saturation absorption amount, the adsorption efficiency of the HC adsorbent when cold falls, and as on the other hand desorption of HC is earlier, the ability to oxidize desorbed HC falls remarkably. Therefore, it is preferable to set the amount of HC adsorbed by the HC adsorbent equal to or less than 70% of the HC saturation absorption amount of the HC adsorbent.

The rhodium (Rh) content of the three-way catalyst unit 10 is set lower than the rhodium (Rh) content of the catalyst layer of the catalyst unit 1 arranged downstream. This is because if the ratio of the former rhodium amount in the catalyst and the latter rhodium amount is 1:1 or greater, the catalyst does not realize its full performance in purifying low concentration exhaust gas component.

Figure 4:
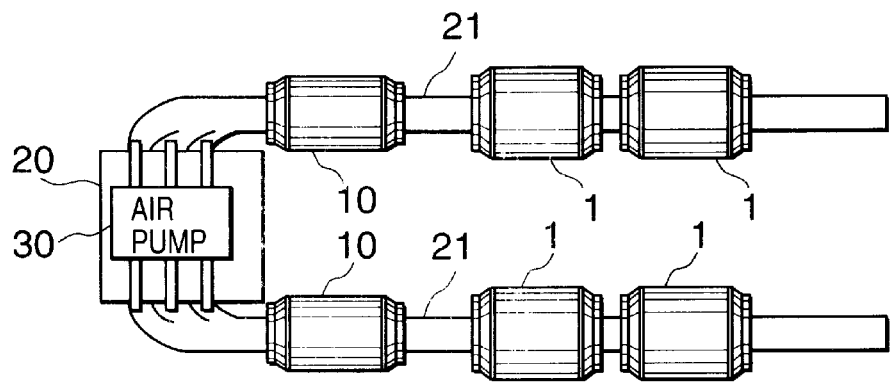
FIG. 4 is a schematic diagram of the exhaust purification device which shows a variation of the third embodiment.

Preferably, plural catalyst units 1 containing HC adsorbents are arranged downstream of the three-way catalyst unit 10 as shown in FIG. 4. By using plural catalyst units 10, the HC discharged in the low temperature region immediately after engine startup is adsorbed in a dispersed manner. As a result, the time for which the catalyst layer formed on the HC adsorbent in the catalyst unit 1 is in an oxygen deficient state due to the HC desorbed from the HC adsorbent is shorter, and the ability of the catalyst to oxidize HC remains at a high level.

The engine 20 in this figure is a V type engine comprising two exhaust pipes 21, each of these pipes 21 being provided with one three-way catalyst unit 10 and two catalyst units 1.

Next, a fourth embodiment of this invention will be described.

This embodiment relates to an exhaust gas purifier combining a catalyst unit with control of fuel injection amount and fuel ignition timing of the engine.

In this embodiment, a three-way catalyst unit 10 comprising palladium (Pd), platinum (Pt) or rhodium (Rh) is installed upstream of the catalyst unit of the aforesaid first embodiment. A powder containing 4 weight % to 15 weight % of Pd (Pt, Rh) is supported in the three-way catalyst 10.

The support amount of Pd (Pt, Rh) is also set to from 100 g/ft$^3$ (3.5 g/liter) to 500 g/ft$^3$ (17.7 g/liter). The amount of HC adsorbed by the HC adsorbent before catalyst activation is set to no more than 70% of the HC saturation amount adsorbed by the HC adsorbent.

Also, according to this embodiment, the fuel ignition timing at engine startup, i.e. during the initial idle running, is set to a position which is retarded by 1 degree to 30 degrees from top dead center for 40 seconds from engine startup.

This expedites rise of exhaust temperature and promotes activation of the catalyst in the three-way catalyst unit 10.

As a means of increasing the exhaust temperature and promoting activation of the exhaust purification catalyst, a good effect is obtained also by maintaining the engine intake air amount to be 10 liter/min or higher, and controlling the air-fuel ratio to from 12 to 18 for 60 seconds from engine startup.

Further, it is preferable that, immediately before desorption of HC from the HC adsorbent starts, the air-fuel ratio of the fuel-air mixture supplied to the engine is set to the stoichiometric air-fuel ratio or leaner. Alternatively, supplementary oxygen or air may be supplied upstream of the catalyst unit 1 or the three-way catalyst unit 10 by an air pump 30 shown in FIG. 5.

For this purpose, a temperature sensor 6 is installed upstream of or inside each catalyst unit 1, and an oxygen sensor 7 which detects the oxygen concentration in the exhaust gas is installed downstream of each catalyst unit 1. The oxygen concentration in the exhaust gas is known to represent the air-fuel ratio in the fuel mixture supplied to the engine. In other words, the oxygen sensor 7 detects the air-fuel ratio in the engine.

When the temperature detected by the temperature sensor 6 is equal to or greater than a predetermined value, oxygen may be supplied from the air pump 30 to the exhaust pipe 21 so that the air-fuel ratio detected by the oxygen sensor 7 is equal to or greater than the stoichiometric air-fuel ratio.

When the temperature detected by the temperature sensor 6 is less than, for example, 110 degrees centigrade, activation of the three-way catalyst is not far advanced, so it is possible that the purifying performance of the three-way catalyst is impaired by supplying oxygen or air. Supply of oxygen is therefore limited to the case when the temperature is equal to or above the predetermined value.

Figure 6:
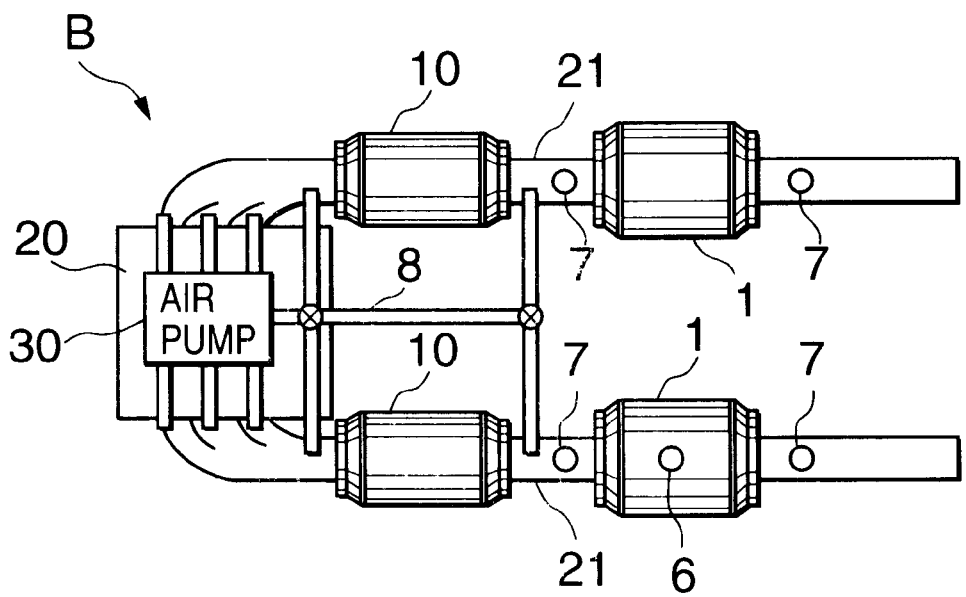
FIG. 6 is a schematic diagram of the exhaust purification device showing a variation of the fourth embodiment.

FIG. 6 shows a variation of the fourth embodiment. Herein, the oxygen sensors 7 are installed both upstream and downstream of the catalyst units 1, while the temperature sensors 6 are installed inside the catalyst units 1.

HC desorption from the HC adsorbent can be detected based on the comparison of air-fuel ratio detected by the oxygen sensors 7 upstream of the catalyst units 1, and the air-fuel ratio detected by the oxygen sensors 7 downstream of the catalyst units 1.

Therefore, if oxygen or air is supplied upon detection of HC desorption so that the air-fuel ratio detected by the downstream oxygen sensors 7 is equal to or greater than the stoichiometric air-fuel ratio, activation of the three-way catalyst can be considerably promoted by supplying the minimum amount of oxygen or air.

Engine fuel injection control and ignition timing control are performed by a controller 11 using a microprocessor.

Signals are input to the controller 11 not only from the aforesaid temperature sensors 6 and air-fuel ratio sensors 7, but also from a starter switch 22 which detects whether or not a starter motor of the engine 20 is operating.

Figure 11:
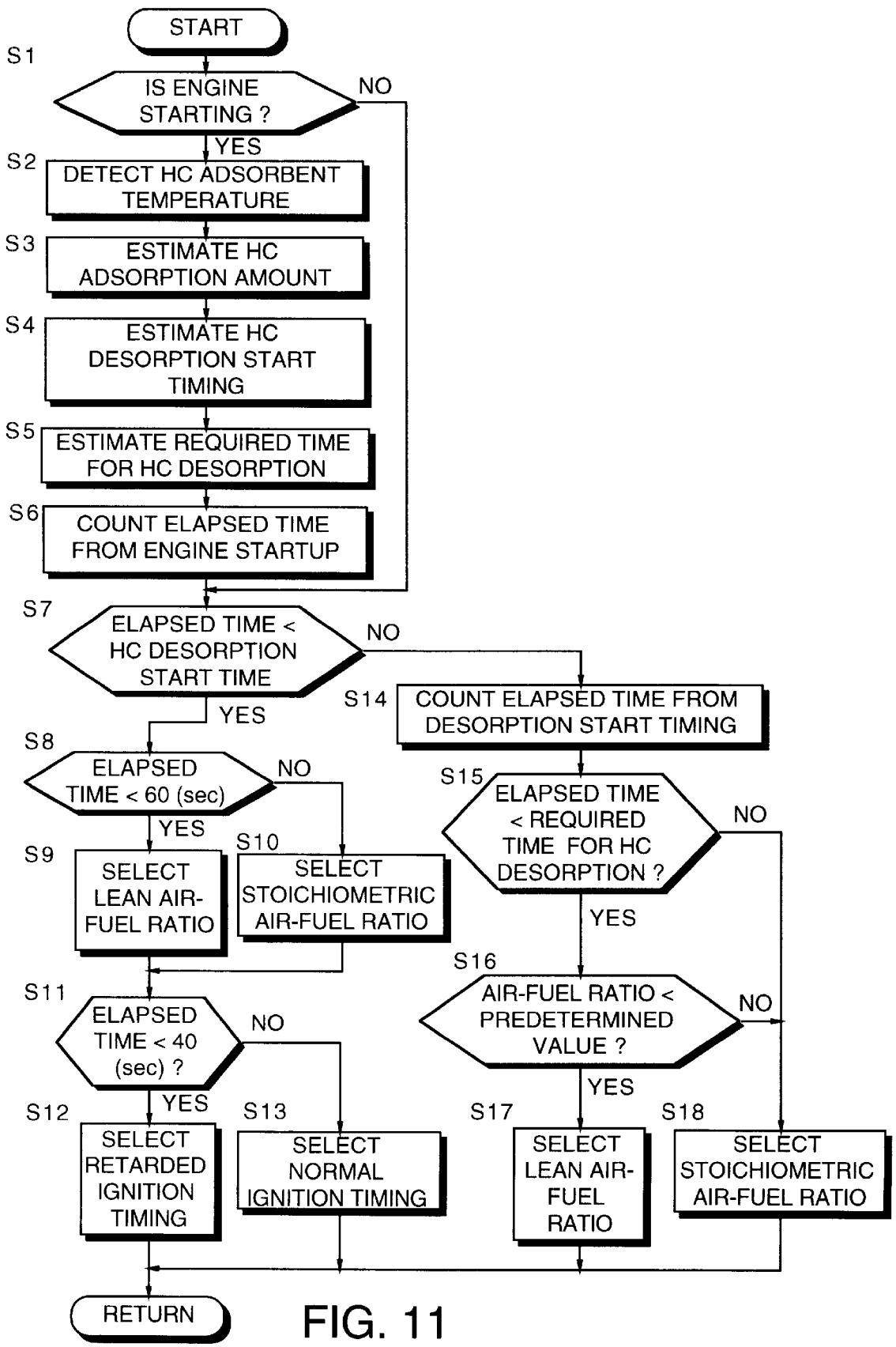
FIG. 11 is a flowchart describing a fuel injection amount and ignition timing control process performed by a controller according to the fourth embodiment.

The aforesaid control process performed by the controller 11 will now be described referring to the flowchart of FIG. 11. This process is performed at a fend interval.

First, in a step S1, it is determined whether or not the engine is starting. When the starter switch 22 was ON on the immediately preceding occasion but is OFF on the present occasion when the process is performed, it is determined that the engine is starting.

When the engine is starting, the routine proceeds to a step S2, otherwise the routine proceeds to a step S6.

In the step S2, the temperature of the HC adsorbent in the catalyst unit 1 is detected. In practice, the inlet temperature of the catalyst unit 1 detected by the temperature sensor 6 or the internal temperature of the catalyst unit 1 is used as the temperature of the HC adsorbent.

In a step S3, the HC adsorption capacity of the HC adsorbent is estimated based on the HC adsorbent temperature.

In a step S4, the timing when HC starts to be desorbed from the HC adsorbent is estimated as an elapsed time from engine startup based on the estimated adsorption capacity.

In a step S5, a required time from when HC adsorption is started until it is completed is estimated based on the estimated adsorption capacity.

In a step S6, an elapsed time from startup of the engine 20 is counted.

In a step S7, it is determined whether or not desorption of HC from the HC adsorbent has started based on the elapsed time from startup of the engine 20 and the aforesaid estimated desorption start timing.

Instead of this determination, the adsorbent temperature may be continuously detected, and it may be determined whether or not the adsorbent temperature has reached a desorption temperature.

When desorption of HC has not started, the routine proceeds to a step S8, and when desorption of HC has started the routine proceeds to a step S14.

In the step S8, it is determined whether or not the elapsed time after engine startup has reached 60 seconds. When the elapsed time is less than 60 seconds, the routine proceeds to a step S9, and after the elapsed time has reached 60 seconds, the routine proceeds to a step S10.

In a step S9, the fuel injector injection amount is set lower than a calculated value so as to control the air-fuel ratio to lean, and the routine proceeds to a step S11.

Alternatively, in the step S10, the fuel injector injection amount is set equal to the calculated value, the air-fuel ratio is controlled to the stoichiometric air-fuel ratio and the routine proceeds to the step S11.

In the step S11, it is determined whether or not an elapsed time after engine startup has reached 40 seconds. When the elapsed time is less than 40 seconds, the routine proceeds to a step S12, and after the elapsed time has reached 40 seconds, the routine proceeds to a step S13.

In the step S12, the ignition timing of the gaseous mixture inside the engine by a spark plug is retarded relative to the usual ignition timing. However, as the engine output falls due to retardation, the retardation amount is kept to the absolute minimum necessary.

After the processing of the step S12, the routine is terminated.

In the step S13, the ignition timing is set to the usual ignition timing and the process is terminated. In this context, the usual ignition timing means the ignition timing after engine warmup is complete.

When it is determined in the step S7 that desorption of HC has started, an elapsed time after start of desorption is counted in a step S14.

In a step S15, the elapsed time measured in the step S14 is compared with the time required for completion of desorption estimated in the step S5.

When the elapsed time is less than the time required to complete desorption, the routine proceed to a step S16, and when the elapsed time has reached the time required to complete desorption, the routine proceeds to a step S18.

In the step S16, it is determined whether or not an output value of the oxygen sensor 7 is less than a predetermined value, i.e. whether or not the value is leaner than a predetermined lean air-fuel ratio. Herein, the oxygen sensor 7 is a sensor which outputs a larger value the higher the oxygen density in the exhaust gas.

When the air-fuel ratio is richer than the predetermined lean air-fuel ratio, the air-fuel ratio is controlled to lean in a step S17 as in the step S9, and the routine is terminated.

During desorption of HC the oxygen density falls and the HC oxidation efficiency of the catalyst falls, so the air-fuel ratio is set to lean to supplement the oxygen deficiency.

When the air-fuel ratio is leaner than the predetermined lean air-fuel ratio or when desorption of HC in the step S15 is complete, the air-fuel ratio is controlled to the stoichiometric air-fuel ratio as in the step S18. and the routine is terminated.

In this way, the HC processing ability of the exhaust purification device is further improved by combining air-fuel ratio control with ignition timing control.

Next, experimental results will be described comparing the HC processing ability of the catalyst unit 1 constructed according to the aforesaid first embodiment with some comparative samples that do not use this invention.

Sample #1

511 g of beta-zeolite powder (H type Si/2Al=75), 57 g of MFI type zeolite (ZSM5) powder, 1215 g of silica sol (20% solid content) and 1800 g of pure water were introduced into a magnetic ball mill, and the mixture was crushed so as to obtain a slurry. After coating the slurry on a cordierite monolithic substrate (300 cells/6 mil, GSA 24.2 $cm^2/cm^3$, hydraulic diameter 1.3 mm), the excess slurry in the cells was removed in a current of air, and the substrate dried and fired for one hour to obtain a catalyst unit A.

The coating amount of slurry was 100 g/liter after converting to an amount after firing.

Alumina powder containing 3 mole % cerium (Ce) was impregnated with an aqueous solution of palladium dinitrodiamine, or the solution was sprayed in while stirring the alumina powder at high speed.

After drying the product at 150° C. for 24 hours, it was fired at 400° C. for one hour and then at 600° C. for one hour to give a Pd impregnated alumina powder (PWD__1).

The Pd concentration in this powder was 6.23 weight %.

The powder may additionally contain lanthanum (La), zirconium (Zr) or neodymium (Nd).

Cerium oxide powder containing 1 mole % lanthanum (La) and 32 mole % zirconium (Zr) was impregnated with an aqueous solution of palladium dinitrodiamine, or the solution was sprayed in while stirring the cerium oxide powder at high speed.

After drying the product at 150° C. for 24 hours, it was fired at 400° C. for one hour and then at 600° C. for one hour to give a Pd impregnated cerium oxide powder (PWD__2).

The Pd concentration in this Pd-impregnated cerium oxide powder (PWD__2) was 20 weight %.

562 g of the Pd-impregnated alumina powder (PWD__1), 288 g of the Pd-impregnated cerium oxide powder (PWD__2), 950 g of nitric acid acidified alumina sol and 1000 g of pure water were introduced into a magnetic ball mill, and the mixture was crushed so as to obtain a slurry. The nitric acid acidified alumina sol was obtained by adding 10 weight % nitric acid to 10 weight % bemite alumina.

The slurry was made to adhere to the aforesaid catalyst unit A, the excess slurry in the cells was removed in a current of air, and the product was dried.

This was fired at 400° C. for one hour to obtain a catalyst unit B comprising a coating layer weight of 60 g/liter.

Alumina powder containing 3 weight % zirconium (Zr) was impregnated with an aqueous solution of rhodium nitrate, or the solution was sprayed in while stirring the alumina powder at high speed.

After drying the product at 150° C. for 24 hours, it was fired at 400° C. for one hour and then at 600° C. for one hour to give a Rh impregnated alumina powder (PWD__3).

The Rh concentration in this Rh-impregnated alumina powder (PWD__3) was 1.25 weight %.

366 g of the Rh-impregnated alumina powder (PWD__3), 300 g of zirconium oxide powder containing 1 mole % lanthanum (La) and 20 mole % cerium (Ce) (PWD_2) and 1135 g of nitric acid acidified alumina sol were introduced into a magnetic ball mill, and the mixture was crushed so as to obtain a slurry.

The slurry was made to adhere to the aforesaid catalyst unit B, the excess slurry in the cells was removed in a current of air, and the product was dried and fired at 400° C. for one hour to obtain a catalyst unit C comprising a coating layer weight of 40 g/liter.

The aforesaid powder may comprise also lanthanum (La), zirconium (Zr) or neodymium (Nd).

Next a barium acetate solution was made to adhere to the aforesaid catalyst unit C, and the product was fired at 400° C. for one hour to obtain a catalyst unit containing 10 g/liter of BaO.

Sample #2

313 g of beta-zeolite powder (H type, Si/2Al=75), 255 g of MFI type zeolite (ZSM5) powder and 1215 g of silica sol (20% solid content) were used to obtain a slurry by the same processing as that of the Sample #1.

The slurry was coated on a cordierite monolithic substrate, and the same processing as that of the Sample #1 was performed to obtain the Sample #2.

Sample #3

454 g of beta-zeolite powder (H type, Si/2Al=75), 57 g of MFI type zeolite (ZSM5) powder, 57 g of USY type zeolite and 1215 g of silica sol (20% solid content) were used to obtain a slurry by the same processing as that of the Sample #1.

The slurry was coated on a cordierite monolithic substrate, and the same processing as that of the Sample #1% was performed to obtain the Sample #3.

Sample #4

454 g of beta-zeolite powder (H type, Si/2Al=75), 57 g of MFI type zeolite (ZSM5) powder, 57 g of $APO_4$ powder and 1215 g of silica sol (20% solid content) were used to obtain a slurry by the same processing as that of the Sample #1.

The slurry was coated on a cordierite monolithic substrate, and the same processing as that of the Sample #1 was performed to obtain the Sample #4.

Sample #5

454 g of beta-zeolite powder (H type, Si/2Al=75), 57 g of MFI type zeolite (ZSM5) powder, 57 g of SAPO and 1215 g of silica sol (20% solid content) were used to obtain a slurry by the same processing as that of the Sample #1.

The slurry was coated on a cordierite monolithic substrate, and the same processing as that of the Sample #1 was performed to obtain the Sample #5.

Sample #6

454 g of beta-zeolite powder (H type, Si/2Al=75), 57 g of MFI type zeolite (ZSM5) powder, 57 g of mordenite powder and 1215 g of silica sol (20% solid content) were used to obtain a slurry by the same processing as that of the Sample #1.

The slurry was coated on a cordierite monolithic substrate, and the same processing as that of the Sample #1 was performed to obtain the Sample #6.

Sample #7

454 g of beta-zeolite powder (H type, Si/2Al=75), 57 g of MFI type zeolite (ZSM5) powder, 23.5 g of ferrierite powder, 23.5 g of A type zeolite powder and 1215 g of silica sol (20% solid content) were used to obtain a slurry by the same processing as that of the Sample #1.

The slurry was coated on a cordierite monolithic substrate, and the same processing as that of the Sample #1 was performed to obtain the Sample #7.

Sample #8

MFI type zeolite (ZSM5) powder was impregnated with palladium (Pd), and dried at 150° C. for 24 hours.

The product was fired at 450° C. for one hour to obtain a Pd-impregnated MFI powder (Pd concentration 2.0 weight %).

This Pd-impregnated MFI powder was used instead of the MFI powder of the Sample #1 to obtain the Sample #8.

Sample #9

MFI type zeolite (ZSM5) powder was impregnated with phosphorus (P). and dried at 150° C. for 24 hours.

The product was fired at 450° C. for one hour to obtain a P-impregnated MFI powder (P concentration 0.4 weight %).

This P-impregnated MFI powder was used instead of the MFI powder of the Sample #1 to obtain the Sample #9.

Sample #10

MFI type zeolite (ZSM5) powder was impregnated with calcium (Ca), and dried at 150° C. for 24 hours.

The product was fired at 450° C. for one hour to obtain a Ca-impregnated MFI powder (Ca concentration 0.2 weight %)

This Ca-impregnated MFI powder was used instead of the MFI powder of the Sample #1 to obtain the Sample #10.

Sample #11

MFI type zeolite (ZSM5) powder was impregnated with magnesium (Mg), and dried at 150° C. for 24 hours.

The product was fired at 450° C. for one hour to obtain an Mg-impregnated MFI powder (Mg concentration 0.4 weight %).

This Mg-impregnated MFI powder was used instead of the MFI powder of the Sample #1 to obtain the Sample #11.

Sample #12

MFI type zeolite (ZSM5) powder was impregnated with lanthanum (La), and dried at 150° C. for 24 hours.

The product was fired at 450° C. for one hour to obtain an La-impregnated MFI powder (La concentration 0.4 weight %).

This La-impregnated MFI powder was used instead of the MFI powder of the Sample #1 to obtain the Sample #12.

Sample #13

MFI type zeolite (ZSM5) powder was impregnated with boron (B), and dried at 150° C. for 24 hours.

The product was fired at 450° C. for one hour to obtain a B-impregnated MFI powder (B concentration 0.4 weight %).

This B-impregnated MFI powder was used instead of the MFI powder of the Sample #1 to obtain the Sample #13.

Sample #14

MFI type zeolite (ZSM5) powder was impregnated successively with phosphorus (P), calcium (Ca), zirconium (Zr) and lanthanum (La).

The product was fired to obtain a (P—Ca—Zr—La)-impregnated MFI powder (each metal 0.1 weight % concentration, total metal concentration 0.4 weight %).

This (P—Ca—Zr—La)-impregnated MFI powder was used instead of the MFI powder of the Sample #1 to obtain the Sample #14.

Sample #15

MFI type zeolite (ZSM5) powder was impregnated successively with phosphorus (P), magnesium (Mg), zirconium (Zr) and cerium (Ce).

The product was fired to obtain a (P—Mg—Zr—Ce)-impregnated MFI powder (each metal 0.1 weight % concentration, total metal concentration 0.4 weight %).

This (P—Ca—Zr—Ce)-impregnated MFI powder was used instead of the MFI powder of the Sample #1 to obtain the Sample #15.

Sample #16

MFI type zeolite (ZSM5) powder was impregnated successively with boron (B), calcium (Ca), lanthanum (La) and neodymium (Nd).

The product was fired to obtain a (B—Ca—La—Nd)-impregnated MFI powder (each metal 0.1 weight % concentration, total metal concentration 0.4 weight %).

This (B—Ca—La—Nd)-impregnated MFI powder was used instead of the MFI powder of the Sample #1 to obtain the Sample #16.

Sample #17

Zirconium oxide powder containing 1 mole % lanthanum (La) and 20 mole % cerium (Ce) was impregnated with an aqueous solution of platinum dinitrodiamine, or the solution was sprayed in while stirring the zirconium oxide powder at high seed.

After drying the product at 150° C. for 24 hours, it was fired at 400° C. for one hour and then at 600° C. for one hour to give a Pt-impregnated zirconium oxide powder (PWD_4).

The Pt concentration in this Pt-impregnated zirconium oxide powder (PWD_4) was 1.53 weight %.

366 g of the Rh-impregnated alumina powder (PWD_3), 300 g of the Pt-impregnated zirconium oxide powder (PWD_4) and 1135 g of nitric acid acidified alumina sol were introduced into a magnetic ball mill, and the mixture was crushed so as to obtain a slurry. This slurry was made to adhere to the aforesaid catalyst unit B, and the same processing as that of the Sample #1 was performed to obtain the Sample #17.

Sample #18

Cerium oxide powder containing 1 mole % lanthanum (La) and 32 mole % zirconium (Zr) was impregnated with an aqueous solution of platinum dinitrodiamine, or the solution was sprayed in while stirring the cerium oxide powder at high speed.

After drying the product at 150° C. for 24 hours, it was fired at 400° C. for one hour and then at 600° C. for one hour to give a Pt-impregnated cerium oxide powder (PWD_5).

The Pt concentration in this Pt-impregnated cerium oxide powder (PWD_4) was 2.0 weight %.

562 g of the Pd-impregnated alumina powder (PWD_1), 144 g of the Pd-impregnated cerium oxide powder (PWD_2), 144 g of the Pt-impregnated cerium oxide powder (PWD_5), 9.50 g of nitric acid acidified alumina sol and 1000 g of pure water were introduced into a magnetic ball mill, and the mixture was crushed so as to obtain a slurry. The nitric acid acidified alumina sol up obtained by adding 10 weight % nitric acid to 10 weight % bemite alumina.

This slurry was made to adhere to the aforesaid catalyst unit A, and the same processing as that of the Sample #1 was performed to obtain the Sample #18.

Sample #19

562 g of the Rh-impregnated alumina powder (PWD_1), 144 g of the Pd-impregnated cerium oxide powder (PWD_2).

144 g of the Pt-impregnated cerium oxide powder (PWD_5), 950 g of nitric acid acidified alumina sol and 1000 g of pure water were introduced into a magnetic ball mill, and the mixture was crushed so as to obtain a slurry. The nitric acid acidified alumina sol was obtained by adding 10 weight % nitric acid to 10 weight % bemite alumina.

This slurry was made to adhere to a cordierite monolithic substrate, and the same processing as that of the Sample #1 was performed to obtain a catalyst unit D.

366 g of the Rh-impregnated alumina powder (PWD_3), 300 g of zirconium oxide powder containing 1 mole % lanthanum (La) and 20 mole % cerium (Ce), 1135 g of nitric acid acidified alumina sol and 1000 g of pure water were introduced into a magnetic ball mill, and the mixture as crushed so as to obtain a slurry.

The slurry was made to adhere to the aforesaid catalyst unit D instead of the catalyst unit B of the aforesaid.

Sample #1, and the same processing was performed as that of the Sample #1 to obtain the Sample #19.

Sample #20

Potassium acetate solution was used instead of barium acetate solution in the case of the Sample #1, and the same processing was performed as for the Sample #1 to obtain the Sample #20 catalyst unit containing 1 g/liter of $K_2O$.

Sample #21

MFI type zeolite (ZSM5) powder was impregnated with silver (Ag), and dried at 150° C. for 24 hours.

The product was fired at 450° C. for one hour to obtain an Ag-impregnated MFI powder (Ag concentration 0.4 weight %).

This Ag-impregnated MFI powder was used instead of the MFI powder of the Sample #1 to obtain the Sample #21.

Sample #22

568 g of beta-zeolite powder (H type, Si/2Al=75) and 1215 g of silica sol (20% solid content) were used to obtain a slurry by the same processing as that of the Sample #1.

The slurry was coated on a cordierite monolithic substrate, and the same processing as that of the Sample #1 was performed to obtain a catalyst unit E.

357 g of the Pd-impregnated alumina powder (PWD_1), 183 g of the Pd-impregnated cerium oxide powder (PWD_2), 188 g of the Rh-impregnated alumina powder (PWD_3), 154 g of zirconium oxide powder containing 1 mole % lanthanum (La) and 20 mole % cerium (Ce), 1185 g of nitric acid acidified alumina sol and 1000 g of pure water were introduced into a magnetic ball mill, and the mixture was crushed so as to obtain a slurry.

This slurry was made to adhere to the catalyst unit E instead of the catalyst unit B of the Sample #1 and the same processing as that of the Sample #1 was performed to obtain the Sample #22.

Sample #23

357 g of the Pd-impregnated alumina powder (PWD_1), 183 g of the Pd-impregnated cerium oxide powder (PWD_2), 188 g of the Rh-impregnated alumina powder (PWD_3), 154 g of the Pt-impregnated zirconium oxide powder (PWD_4), 1185 g of nitric acid acidified alumina sol and 1000 g of pure water were introduced into a magnetic ball mill, and the mixture was crushed so as to obtain a slurry.

This slurry was made to adhere to the catalyst unit E instead of the catalyst unit B of the Sample #1, and the same processing as that of the Sample #1 was performed to obtain the Sample #23.

Sample #24

Zirconium oxide powder containing 1 mole % lanthanum (La) and 20 mole % cerium (Ce) was impregnated with an aqueous solution of rhodium nitrate, or the solution was sprayed in while stirring the zirconium oxide powder at high speed.

After drying the product at 150° C. for 24 hours, it was fired at 400° C. for one hour and then at 600° C. for one hour to give a Rh-impregnated zirconium oxide powder (PWD_6).

The Rh concentration in this Rh-impregnated zirconium oxide powder (PWD_6) was 4.0 weight %.

568 g of beta-zeolite powder (H type, Si/2Al=75), 35 g of the Rh-impregnated zirconium oxide powder (PWD_6), 1215 g of silica sol (20% solid content) and 1800 g of pure water were introduced into a magnetic ball mill, and the mixture was crushed so as to obtain a slurry.

This slurry was coated on a cordierite monolithic substrate (300 cells/6 mil, GSA 24.1 cm²/cm³, hydraulic diameter 1.1 mm). The excess slurry in the cells was removed in a current of air, the support dried, and fired at 400° C. for one hour to obtain a Sample #24 catalyst unit containing a coating layer amount of 143.5 g/liter.

Next, some comparative samples which do not use this invention will be described for the purpose of comparison with the aforesaid samples.

Comparative Sample #1

A catalyst unit of the Comparative Sample #1 was obtained by using a cordierite monolithic substrate with 900 cells /4 mil, GSA 41.1 cm²/cm³ and hydraulic diameter 0.74 mm in the aforesaid Sample #1.

Comparative Sample #2

A catalyst unit of the Comparative Sample #2 was obtained by using Rh for the second layer and Pd for the third layer in the aforesaid Sample #2.

Comparative Sample #3

A catalyst unit of the Comparative Sample #3 was obtained by making the coating weight ratio between the zeolite in the first layer and the second and third layers of the catalyst layer 10:1 in the aforesaid Sample #1.

Comparative Sample #4

A catalyst unit of the Comparative Sample #4 was obtained by making the coating weight ratio between the zeolite in the first layer and the second and third layers of the catalyst layer 1:5 in the aforesaid Sample #1.

Comparative Sample #5

A catalyst unit of the Comparative Sample #5 was obtained by using only A type zeolite for the zeolite in the first layer in the aforesaid Sample #1.

Comparative Sample #6

A catalyst unit of the Comparative Sample #6 was obtained by using only USY type zeolite for the zeolite in the first layer in the aforesaid Sample #1.

Comparative Sample #7

A catalyst unit of the Comparative Sample #7 was obtained by using only MFI type zeolite for the zeolite in the first layer in the aforesaid Sample #1.

Comparative Sample #8

A catalyst unit of the Comparative Sample #8 was obtained omitting the final barium (Ba) immersion step #8 the aforesaid Sample #1.

The specifications of the Samples #1–#24 according to this invention and the Comparative Samples #1–#8 not according to this invention are shown in FIGS. 12 and 13.

The HC purification performance was evaluated by an A-bag in a LA-4 in an EC mode test under the following conditions. The test was performed using the device shown in FIG. 4.

Describing this devices an exhaust pipe 21 was connected to each bank of a V type six-cylinder engine 1 of an automobile.

A catalytic converter 10 using a three-way catalyst and two catalytic converters 1 using a catalyst unit according to the Samples #1–#24 and Comparative Samples #1–#8 were installed in series in the exhaust pipe 21.

The engine 1 was provided with an air pump 30 to supply secondary air to the exhaust gas.

Before testing performance, the catalyst unit was connected to the engine under the following conditions and an endurance test was performed.

Engine exhaust amount: 3000 cc
Fuel gasoline: Pb=12 mg/gallon, S=300 ppm
Catalyst inlet gas temperature: 650° C.
Test period: 100 hours The Conditions of the Performance Test were as Follows.

Catalyst capacity for one bank: Three-way catalyst unit 1.3 liter+HC catalyst unit 2.6 liter
Test vehicle: V type 6 cylinder 3.3 liter engine manufactured by Nissan Motor Co. Ltd.
Hydrocarbons discharged on engine startup (amount contained in catalyst inlet gas):
Carbon number: C2–C3 21.0%
C4–C6 33.0%
C7–C9 40.0%

The above test results are shown in FIGS. 14 and 15.

From these results, it is seen that the HC purification performance is higher for all of the Samples #1–#24 than for the Comparative Samples #1–#8.

Next, test results will be described wherein a catalyst unit was manufactured based on the aforesaid second to fourth embodiments, and HC processing ability was compared with a catalyst unit not according to this invention.

Of the following catalyst units manufactured in the Samples #25–#34, the units in the Sample #25, Sample #26 and Sample #33 are three-way catalyst units, while those in the other samples are catalyst units containing an HC absorbent.

Also, in the Comparative Samples #9–#14, the catalyst unit in the Comparative Sample #14 is a three-way catalyst unit while those in the other comparative samples are catalyst units containing an HC adsorbent.

Sample #25

Alumina powder containing 3 mole % cerium (Ce), 3 mole % zirconium (Zr) and 2 mole % lanthanum (La) (PWD__7) was impregnated with an aqueous solution of palladium nitrate.

After drying the product at 150° C. for 12 hours, it was fired at 400° C. for one hour to give a Pd impregnated alumina oxide powder (PWD__8).

The Pd concentration in this Pd-impregnated alumina powder (PWD__8) was 16 weight %.

A cerium oxide powder containing 1 mole % lanthanum (La) and 32 mole % zirconium (Zr) (PWD__9) was impregnated with an aqueous solution of palladium nitrate.

After drying the product at 150° C. for 12 hours, it was fired at 400° C. for one hour to give a powder of cerium oxide ($La_{0.01}Zr_{0.32}Ce_{0.67}O_x$) (PWD__10).

The Pd concentration in this powder (PWD__10) was 6.0 weight %.

565 g of the powder (PWD__8) 377 g of the powder (PWD__10), 58.5 g of active alumina and 2000 g of nitric acid were introduced into a magnetic ball mill, and the mixture was crushed so as to obtain a slurry.

This slurry was coated on a cordierite monolithic substrate (1.0 liter, 600 cells/4 mil, GSA 34.5 cm²/cm³, hydraulic diameter 0.93 mm), and the excess slurry in the cells was removed in a current of air. The product was dried, and fired at 400° C. for one hour.

This process was repeated twice to obtain a catalyst unit F with a coating amount of 100 g per liter of support.

The palladium support amount in this catalyst unit F was 320.9 g/ft³ (11.3 g/liter).

Next, a barium acetate solution was made to adhere to the catalyst unit F, and the product was fired at 400° C. for one hour to obtain the catalyst unit of the Sample #25 containing 10 g/liter of BaO.

Sample #26

565 g of the Pd-impregnated alumina powder (PWD__8) and 2000 g of nitric acid were introduced into a magnetic ball mill, and the mixture was crushed so as to obtain a slurry.

This slurry was coated on the same cordierite monolithic substrate as was used in the Sample #25. The excess slurry in the cells was removed in a current of air, and the product was dried. The dried product was fired at 400° C. for one hour.

This process was repeated twice to obtain a catalyst unit G with a coating amount of 91.7 g per liter of substrate.

The palladium support amount in this catalyst unit G was 293.3 g/ft$^3$ (10.36 g/liter).

Alumina powder containing 3 mole % zirconium (Zr) (PWD_11) was impregnated with an aqueous solution of rhodium nitrate.

After drying the product at 150° C. for 12 hours, it was fired at 400° C. for one hour to give a Rh-impregnated alumina powder (PWD_12).

The Rh concentration of this powder (PWD_12) was 4.0 weight %.

Zirconium oxide powder containing 1 mole % lanthanum (La), 20 mole % cerium (Ce) and 79 mole % of zirconium (Zr) (PWD_13) was impregnated with an aqueous solution of platinum dinitrodiamine. After drying the product at 150° C. for 12 hours, it was fired at 400° C. for one hour to give a Pt-impregnated zirconium oxide powder (PWD_14).

The Pt concentration of this powder (PWD_14) was 4.0 weight %.

117.5 g of the Rh-impregnated alumina powder (PWD_12), 117.5 g of the Pt-impregnated zirconium oxide powder (PWD_14), 15 g of active alumina and 1000 g of nitric acid were introduced into a magnetic ball mill, and the mixture was crushed so as to obtain a slurry.

This slurry was coated on a cordierite monolithic substrate and the excess slurry in the cells was removed tin a current of air. After drying the substrate ft was fired at 400° C. for one hour to obtain a coating amount of 25 g/liter. The coating amount of the whole catalyst unit was 116.7 g per liter of substrate.

The Rh support amount was 13.3 g/ft$^3$ (0.48 g/liter), and the
Pt support amount was 13.3 g/ft$^3$ (0.48 g/liter).

A barium acetate solution was made to adhere to the catalyst unit, and the product was fired at 400° C. for one hour to obtain the catalyst unit of the Sample #26 containing 10 g/liter of BaO.

Sample #27

800 g of H-type beta-zeolite, 1000 g of silica sol (20% solid content) and 1000 g of pure water were introduced into a magnetic ball mill, and the mixture was crushed so as to obtain a slurry. After coating the slurry on a cordierite monolithic support (1.3 liter, 200 cells/10 mil, GSA 19.0 cm$^2$/cm$^3$, hydraulic diameter 1.53 mm), the excess slurry in the cells was removed in a current of air. After drying, the product was fired at 400° C. for one hour.

In this way, a catalyst unit H having a coating amount of 200 g/liter was obtained.

The zirconium oxide powder containing 1 mole % lanthanum (La), 20 mole % cerium (Ce) and 79 mole % of zirconium (Zr) (PWD_13) was impregnated with an aqueous solution of rhodium nitrate. After drying the product at 150° C. for 12 hours, it was fired at 400° C. for one hour to give a Rh-impregnated zirconium oxide powder (PWD_15). The Rh concentration in this powder (PWD_15) was 8.0 weight %.

500 g of the Pd-impregnated alumina powder (PWD_1), 80 g of the cerium oxide powder (La$_{0.01}$Zr$_{0.52}$Ce$_{0.67}$O$_x$) (PWD_10), 353 g of the Rh-impregnated zirconium oxide powder (PWD_15), 47 g of alumina powder (PWD_7), 20 g of active alumina, and 1000 g of an aqueous solution of nitric acid were introduced into a magnetic ball mill, and the mixture was crushed so as to obtain a slurry. The slurry was made to adhere to the aforesaid catalyst unit H, and the excess slurry in the cells was removed in a current of air. After drying the product, it was fired at 400° C. for one hour.

This process was performed twice to obtain a coating layer of 100 g/liter of substrate.

The coating amount over the whole catalyst unit was 300 g/liter of substrate.

The Pd impregnation amount was 240.0 g/ft$^3$ (8.48 g/liter) and the Rh impregnation amount was 80.0 g/ft$^3$ (2.83 g/liter).

Next, a barium acetate solution was made to adhere to this catalyst unit, and the product was fired at 400° C. for one hour to obtain a catalyst unit according to the Sample #27 containing 10 g/liter of BaO.

Sample #28

The procedure was the same as the Sample #27 excepting that instead of using 800 g of H type beta zeolite, 500 g of H type beta zeolite, 100 g of MFI type zeolite (ZSM5), 100 g of USY type zeolite, 50 g of Y type zeolite and 50 g of mordenite were used to obtain a catalyst unit according to the Sample #28.

Sample #29

The procedure was the same as the Sample #27 excepting that instead of using 800 g of H type beta zeolite 800 g of H type beta zeolite containing 0.5 weight % of boron (B) and 0.1 weight % of calcium (Ca) was used to obtain a catalyst unit according to the Sample #29.

Sample #30

The procedure was the se as the Sample #27 excepting that instead of using 800 g of H type beta zeolite, 600 g of H type beta zeolite containing 0.5 weight % of phosphorus (P) and 0.1 weight % of magnesium (Mg), 100 g of MFI type zeolite containing 0.5 weight % of boron (B) and 0.1 weight % of calcium Ca), and 100 g of USI type zeolite containing 0.5 weight % of phosphorus (P) and 0.1 weight % of magnesium (Mg) were used to obtain a catalyst unit according to the Sample #30.

Sample #31

20 g of ammonium dihydrogen phosphate was dissolved in 1500 g of pure water, 1000 g of H type beta zeolite was added, 25% ammonia water was dripped in to adjust the pH to 9.0, and the solution was stirred for 24 hours, The beta-zeolite was filtered off from this mixture, and after drying at 120° C. for 24 hours, the product was fired at 650° C. in a current of air for 2 hours to obtain a powder (PWD_16).

This powder (PWD_16) was impregnated with palladium nitrate so as to obtain a powder (PWD_17) containing 1 weight % palladium (Pd) and 0.5 weight % phosphorus (P).

800 g of this powder (PWD_17), 1000 g of silica sol (20% solid content) and 1000 g of an aqueous solution of nitric acid were introduced into a magnetic ball mill, and the mixture was crushed so as to obtain a slurry.

The slurry was coated on a cordierite monolithic substrate (1.3 liter, 200 cells/10 mil, GSA 19.0 cm$^2$/cm$^3$, hydraulic diameter 1.53 mm).

Subsequently, the excess slurry in the cells was removed in a current of air, the product was fired at 400° C. for one hour, and a catalyst unit I having a coating amount of 200 g/liter was obtained.

The Pd impregnation amount of the catalyst unit I was 45.3 g/ft$^3$ (1.6 g/liter).

500 g of the Pd-impregnated alumina powder (PWD_8), 80 g of the cerium oxide powder (La$_{0.01}$Zr$_{0.32}$Ce$_{0.67}$O$_x$) (PWD_10), 30 g of the alumina powder (PWD_7), 15 g of active alumina and 1000 g of an aqueous solution of nitric acid were introduced into a magnetic ball mill, and the mixture was crushed so as to obtain a slurry.

The slurry was made to adhere to the aforesaid catalyst unit I, and the excess slurry in the cells was removed in a current of air. After drying the product, it was fired at 400° C. for one hour.

This process was performed twice to obtain a catalyst unit J.

Next, 353 g of the Rh-impregnated zirconium oxide powder (PWD_15), 30 g of the alumina powder (PWD_7), 5 g of active alumina and 1000 g of an aqueous solution of nitric acid were introduced into a magnetic ball mill, and the mixture was crushed so as to obtain a slurry, The slurry was coated on the catalyst unit J, excess slurry in the cells was removed in a current of air, and after drying the product, it was fired at 400° C. for one hour.

By performing this process twice, 100 g of coating layer/liter of support was added to obtain a catalyst unit K.

The coating amount on the whole of the catalyst unit K was 300 g/liter of substrate.

The Pd impregnation amount of the catalyst unit K was 285.4 g/ft$^3$ (10.08 g/liter), and the Rh impregnation amount was 80 g/ft$^3$ (2.83 g/liter).

Finally, a barium acetate solution was made to adhere to the catalyst unit K, and the product was fired at 400° C. for one hour to obtain a catalyst unit of the Sample #31 containing 10 g/liter of BaO.

Sample #32

In the Sample #27, instead of 800 g of H type beta zeolite, 500 g of H type beta zeolite containing 0.28 weight % of palladium (Pd), 0.2 weight % of phosphorus (P), 0.3 weight % of boron (B), 0.1 weight % of magnesium (Mg) and 0.1 weight % of calcium (Ca), 100 g of MFI type zeolite (ZSM5) containing 0.33 weight % of platinum (Pt) and 0.1 weight % of calcium (Ca), 200 g of USY type zeolite containing 0.28 weight % of palladium (Pd) and 0.2 weight % of phosphorus (P), and 100 g of mordenite containing 0.33 weight % of platinum (Pt), 0.1 weight % of boron (B) and 0.1 weight % magnesium (Mg) were used to obtain a catalyst unit L by the same processing as that of the Sample #27.

The coating amount of this catalyst unit L was 200 g/liter of substrate. The Pd impregnation amount was 11.1 g/ft$^3$ (0.39 g/liter) and the Pt impregnation was 3/7 g/ft$^3$ (0.13 g/liter).

30 g of alumina powder (PWD_7), 500 g of the Pd-impregnated alumina powder (PWD_8), 80 g of the cerium oxide powder (La$_{0.01}$Zr$_{0.32}$Ce$_{0.67}$O$_x$) (PWD_10), 20 g of active alumina and 1000 g of an aqueous solution of nitric acid were introduced into a magnetic ball mill, and the mixture was crushed so as to obtain a slurry.

The slurry was made to adhere to the aforesaid catalyst unit L, and the excess slurry in the cells was removed in a current of air to dry the product, which was fired at 400° C. for one hour.

Next, 176 g of the Rh-impregnated alumina powder (PWD_12), 117 g of the Pt-impregnated zirconium oxide powder (PWD_14), 177 g of the Rh-impregnated zirconium oxide powder (PWD_15), 30 g of active alumina and 1000 g of an aqueous solution of nitric acid were introduced into a magnetic ball mill, and the mixture was crushed so as to obtain a slurry.

The slurry was coated on the catalyst unit M, and excess slurry in the cells was removed in a current of air to dry the product which was fired at 400° C. for one hour.

Next, a barium acetate solution was made to adhere to this catalyst unit, and the product was fired at 400° C. for one hour to obtain a catalyst unit of the Sample #32 containing 10 g/liter of BaO.

In the process from the catalyst unit M to this catalyst unit, the newly added coating layer is 50 g/liter of catalyst, and the layer coating amount of the catalyst unit of the Sample #32 is 250 g/liter of substrate.

The Pd impregnation amount was 251.2 g/ft$^3$ (8.87 g/liter), the Pt impregnation amount was 16.9 g/ft$^3$ (0.60 g/liter) and the Rh impregnation amount was 40.0 g/ft$^3$ (1.42 g/liter).

Sample #33

1324 g of the Pd-impregnated alumina powder (PWD_8), 106 g of the Rh impregnated alumina powder (PWD_12), 27 g of the Pt impregnated zirconium oxide powder (PWD_14), 43 g of active alumina and 2000 g of an aqueous solution of nitric acid were introduced into a magnetic ball mill, and the mixture bias crushed so as to obtain a slurry.

The slurry was made to adhere to a cordierite monolithic support (1.0 liter, 900 cells/2 mil, GSA 43.6 cm$^2$/cm$^3$, hydraulic diameter 0.78 mm), and after the excess slurry in the cells was removed in a current of air, the product was fired at 400° C. for one hour.

By performing this process twice, a catalyst unit having a coating amount of 150 g per liter of substrate was obtained.

Next, a barium acetate solution was made to adhere to this catalyst unit, and the product was fired at 400° C. for one hour to obtain a catalyst unit of the Sample #33 containing 10 g/liter of BaO.

In this catalyst unit, the Pd impregnation amount 600.0 g/ft$^3$ (21.2 g/liter), the Pt impregnation amount was 3.0 g/ft$^3$ (0.11 g/liter) and the Rh impregnation amount was 12.0 g/ft$^3$ (0.42 g/liter).

Sample #34

800 g of H type beta zeolite, 88.3 g of the Rh-impregnated zirconium oxide powder (PWD_15), 161.5 g of the alumina powder (PWD_11), 1000 g of silica sol (20% solid content) and 1000 g of pure water were introduced into a magnetic ball mill, and the mixture was crushed so as to obtain a slurry.

The slurry was made to adhere to a cordierite monolithic substrate (1.3 liter, 200 cells/20 mil, GSA 19.0 cm$^2$/cm$^3$, hydraulic diameter 1.53 mm), and after the excess slurry in the cells was removed in a current of air, the product was fired at 400° C. for one hour.

In this way, a catalyst unit N having a coating unit of 250 g/liter of substrate was obtained.

500 g of the Pd-impregnated alumina powder (PWD_8), 80 g of the cerium oxide powder (La$_{0.01}$Zr$_{0.32}$Ce$_{0.67}$O$_x$) (PWD_10), 176.5 g of the Rh-impregnated zirconium oxide powder (PWD_15), 203 g of the alumina powder (PWD_7), 40 g of the alumina powder (PWD_7), 20 g of active alumina and 1000 g of an aqueous solution of nitric acid were introduced into a magnetic ball mill, and the mixture was crushed so as to obtain a slurry.

The slurry was made to adhere to the aforesaid catalyst unit N, the excess slurry in the cells was removed in a current of air, and the product was fired at 400° C. for one hour.

This process was performed twice to obtain 300 g of a catalyst unit O having an additional coating layer of 100 g/liter of support and a total coating amount of 300 g/liter of support.

In this catalyst unit, the Pd impregnation amount was 240.0 g/ft$^3$ (8.48 g/liter) and the Rh impregnation amount was 80.0 g/ft$^3$ (2.83 g/liter).

Finally, a barium acetate solution was made to adhere to this catalyst unit O, and the product was fired at 400° C. for one hour to obtain a catalyst unit of the Sample #34 containing 10 g/liter of BaO.

Next, comparative samples not using this invention will be described for purposes of comparison with the aforesaid Samples #25–#34.

Comparative Sample #9

A catalyst unit of the Comparative Sample #9 was obtained by making the specification of the cordierite monolithic substrate 600 cells/4 mil, GSA 36.2 cm$^2$/cm$^3$ and hydraulic diameter 0.97 mm in the Sample #27.

Comparative Sample #10

A catalyst unit of the Comparative Sample #10 was obtained by making the specification of the cordierite monolithic substrate 900 cells/4 mil, GSA 41.1 cm$^2$/cm$^3$ and hydraulic diameter 0.74 mm.

Comparative Sample #11

800 g of H-type beta-zeolite, 1000 g of silica sol (20% solid content) and 1000 g of pure water were introduced into a magnetic ball mill, and the mixture was crushed so as to obtain a slurry. After coating the slurry on a cordierite monolithic substrate (1.3 liter, 200 cells/10 mil, GSA 19.0 cm$^2$/cm$^3$, hydraulic diameter 1.53 mm), the excess slurry in the cells was removed in a current of air. After drying, the product was fired at 400° C. for one hour.

In this way, a catalyst unit P having a coating weight of 20 g/liter of substrate was obtained.

A catalyst unit of the Comparative Sample #11 was obtained by using the catalyst unit P instead of the catalyst unit H in the Sample #27.

Comparative Sample #12

800 g of H-type beta-zeolite, 1000 g of silica sol (20% solid content) and 1800 g of pure water were introduced into a magnetic ball mill, and the mixture was crushed so as to obtain a slurry. After coating the slurry on a cordierite monolithic substrate (1.3 liter, 200 cells/10 mil, GSA 19.0 cm$^2$/cm$^3$, hydraulic diameter 1.53 mm), the excess slurry in the cells was removed in a current of air. After drying, the product was fired at 400° C. for one hour.

In this way, a catalyst unit Q having a coating amount of 300 g/liter was obtained 160.0 g of a Pd-impregnated alumina powder containing a Pd concentration of 50 weight % (PWD__16) obtained by impregnating the alumina powder (PWD__7) with palladium, 17 g of a Pd-impregnated cerium oxide powder containing a Pd concentration of 28 weight % (PWD__17) obtained by impregnating the cerium oxide powder (PWD__9) with palladium, 113.0 g of a Rh-impregnated zirconium oxide powder containing an Rh concentration of 25 weight % (PWD__18) obtained by impregnating the zirconium oxide powder (PWD__13) with rhodium, 10 g of active alumina and 500 g of an aqueous solution of nitric acid were introduced into a magnetic ball mill, and the mixture was crushed so as to obtain a slurry. The slurry was made to adhere to the aforesaid catalyst unit Q, and the excess slurry in the cells was removed in a current of air. After drying the product, it was fired at 400° C. for one hour.

This process was performed twice to obtain an additional coating layer of 30 g/liter of substrate so that the coating amount over the whole catalyst unit was 330 g/liter of substrate.

The Pd impregnation amount was 240.0 g/ft$^3$ (8.48 g/liter) and the Rh impregnation amount was 80.0 g/ft$^3$ (2.83 g/liter).

Next, a barium acetate solution was made to adhere to this catalyst unit, and the product was fired at 400° C. for one hour to obtain a catalyst unit of the Comparative Sample #12 containing 10 g/liter of BaO.

Comparative Sample #13

659 g of the Pd-impregnated alumina powder (PWD__8), 80 g of the cerium oxide powder ($La_{0.01}Zr_{0.32}Ce_{0.67}O_x$) (PWD__10), 30 g of the alumina powder (PWD__7), 35.3 g of the Rh-impregnated zirconium oxide powder (PWD__15), 206 g of alumina powder (PD__7).

20 g of active alumina and 1000 g of an aqueous solution of nitric acid were introduced into a magnetic ball mill, and the mixture was crushed so as to obtain a slurry.

The slurry was made to adhere to the aforesaid catalyst unit H, and the excess slurry in the cells was removed in a current of air. After drying the product, it was fired at 400° C. for one hour.

This process was performed twice to obtain an additional coating layer of 100 g/liter of substrate so that the coating amount over the whole catalyst unit was 300 g/liter of substrate. The Pd impregnation amount was 312.0 g/ft$^3$ (11.02 g/liter) and the Rh impregnation amount was 8.0 g/ft$^3$ (0.28 g/liter).

Next, a barium acetate solution was made to adhere to this catalyst unit, and the product was fired at 400° C. for one hour to obtain a catalyst unit of the Comparative Sample #13 containing 10 g/liter of BaO.

Comparative Sample #14

162 g of the Pd-impregnated alumina powder (PWD__8), 80 g of the cerium oxide powder a (PWD__10), 30 g of the alumina powder (PWD__7), 15 g of the Rh-impregnated zirconium oxide powder (PWD__15), 723 g of the alumina powder (PWD__7), 20 of active alumina and 1000 g of an aqueous solution of nitric acid were introduced into a magnetic ball mill, and the mixture was crushed so as to obtain a slurry.

The slurry was made to adhere to a cordierite monolithic substrate (1.0 liter, 900 cells/2 mil, GSA 34.6 cm$^2$/cm$^3$, hydraulic diameter 0.78 mm), and after the excess slurry in the cells was removed in a current of air, the product was fired at 400° C. for one hour.

By performing this process twice, a catalyst unit having a coating amount of 100 g per liter of substrate was obtained.

In this catalyst unit, the Pd impregnation amount was 73.3 g/ft$^3$ (2.59 g/liter) and the Rh impregnation amount was 6.7 g/ft$^3$ (0.24 g/liter).

Next, a barium acetate solution was made to adhere to this catalyst unit, and the product was fired at 400° C. for one hour to obtain a catalyst unit of the Comparative Sample #A14 containing 10 g/liter of BaO.

The three-way catalysts of the Samples #25, #A26, #33, and Comparative Sample #14 were connected to an engine and a durability test was performed under the following conditions.

Engine discharge capacity: 3000 cc

Fuel: No-lead gasoline

Catalyst inlet gas temperature: 700° C.

Test period: 100 hours

Inlet gas composition:
 CO 0.5±0.1%
 $O_2$ 0.5±0.1%
 HC Approx. 1100 ppm
 NO 1300 ppm
 $CO_2$ 15%

Air-fuel ratio fluctuation: 5500 times

Fluctuation period: 65 seconds/fluctuation
 A/F=14.6: 55 seconds
 Fuel cut: 5 seconds
 Fluctuation to rich: 5 seconds (CO=2%)

Next, a HC purification performance test, using an A-bag of an LA-4 in the EC mode, was performed on the aforesaid catalyst units which had been subjected to the endurance test by applying them in the exhaust gas purifiers A–F shown in FIGS. 5–10.

The Samples #A35–#54 according to this invention were designed, as shown by the tables of FIGS. 18–20, according to combinations of the catalyst units of the Sample #35–#54 with the exhaust gas purifiers A–F.

The Comparative Samples #15–#26 were designed, as shown by the tables of FIGS. 20–21, according to combinations of the catalyst units of the Comparative Samples #9–#14 with the exhaust gas purifiers A–F.

It should be noted that when the conditions are different as regards delay of ignition timing or lean shift of the air-fuel ratio, the different conditions are treated as different samples even when the exhaust gas purifier used, including the three-way catalyst unit 10 or catalyst unit 1, is the same.

In FIGS. 18–21, the alphabetical letters in the test device column correspond to the devices A–F in FIGS. 5–10.

The numbers in the three-way catalyst unit column and catalyst unit column refer to the above examples and comparative examples.

Here, the exhaust gas purifiers of FIGS. 6–10 will be described. In these diagrams, the controller 11 is not shown.

Figure 5:
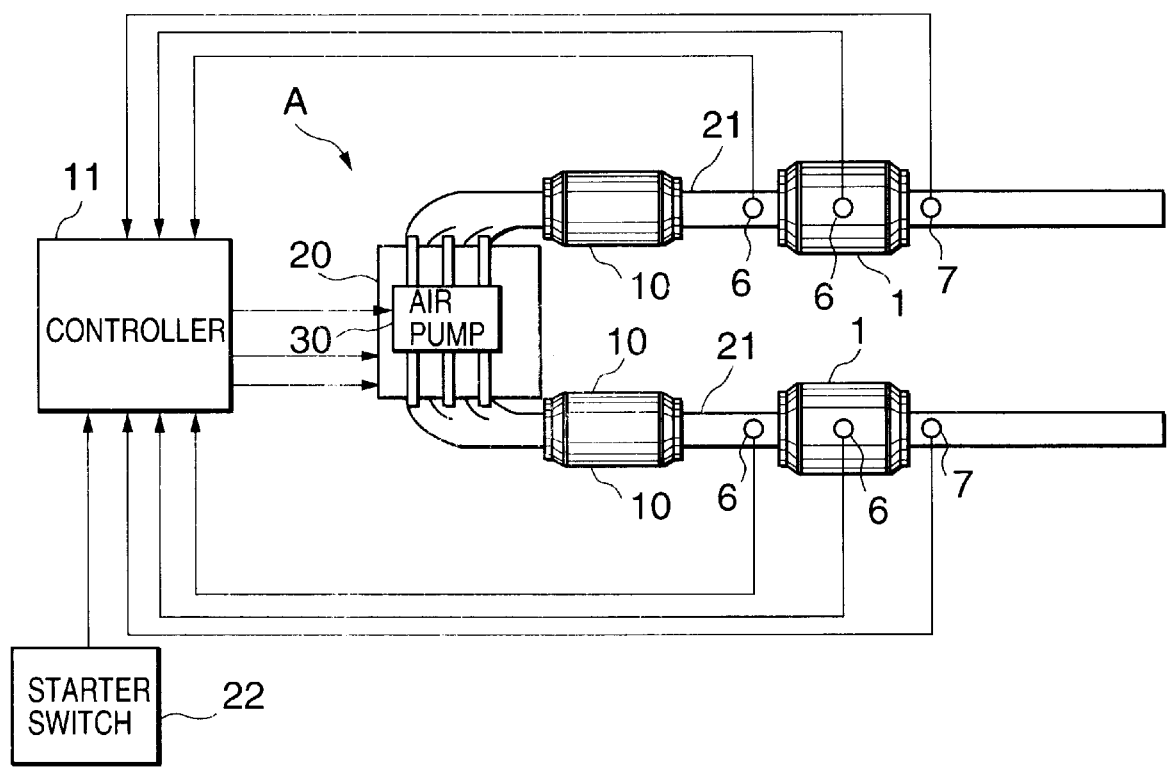
FIG. 5 is a schematic diagram of the exhaust purification device according to a fourth embodiment of this invention.
Figure 7:
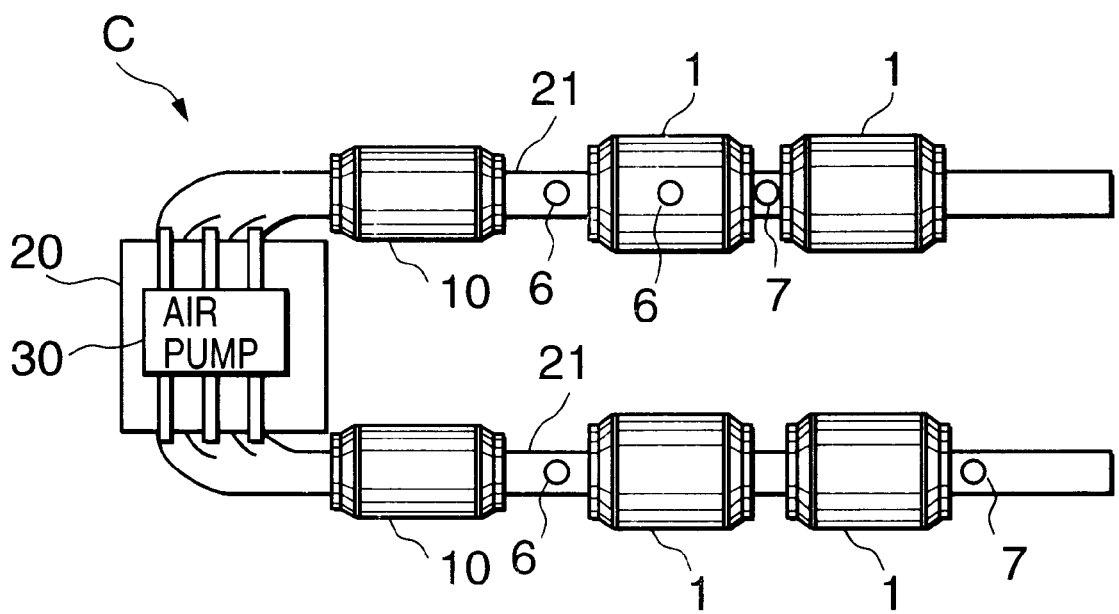
FIG. 7 is a schematic diagram of the exhaust purification device showing another variation of the fourth embodiment.

The exhaust gas purifier B in FIG. 6 does not have the temperature sensors 6 upstream of the catalyst units 1 of the device A of FIG. 5, but does have oxygen sensors 7 instead. The purifier B is also provided with an air pipe 8 for supplying the secondary air from the air pump 3 to upstream and downstream of the catalyst unit 10. The temperature sensor 6 in one of the catalyst units 1 may be omitted The exhaust gas purifier C of FIG. 7 is provided with two catalyst units 1 for each exhaust pipe 21.

The temperature sensors 6 are provided at the inlet of the catalyst units 1 upstream of the exhaust pipes 21 and inside one of the units 1. The oxygen sensor 7 on one of the exhaust pipes 21 is provided between the catalyst units 1, while the oxygen sensor 7 on the other exhaust pipe 21 is provided at the outlet of the downstream catalyst unit 1.

Figure 8:
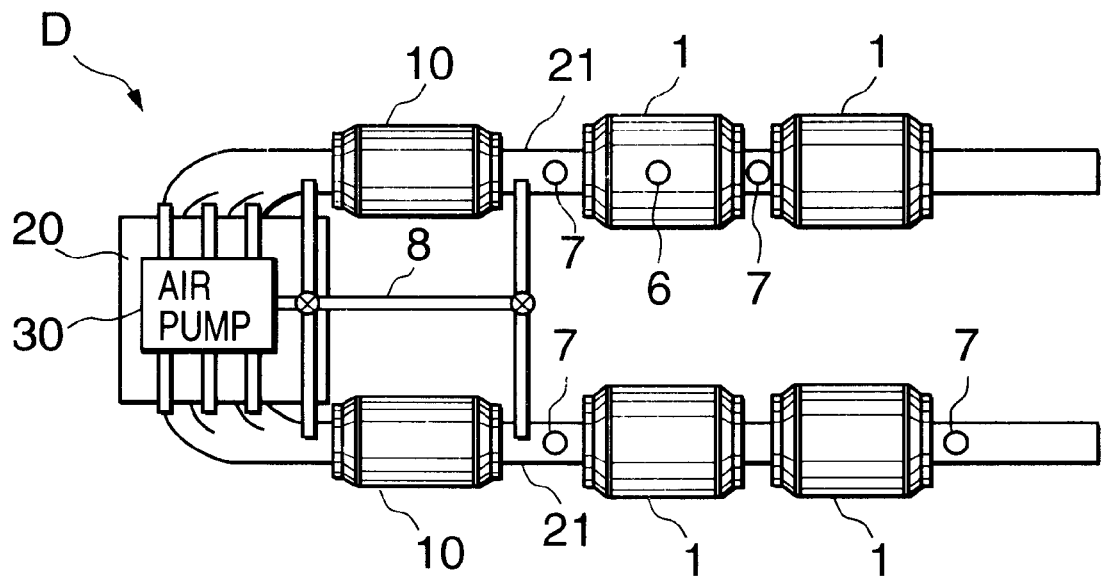
FIG. 8 is a schematic diagram of the exhaust purification device showing yet another variation of the fourth embodiment.

In the exhaust gas purifier D of FIG. 8, the temperature sensors 6 upstream of the catalyst units 1 in the purifier C are replaced by the oxygen sensors 7. The purifier D is also provided with the air pipe 8 in the purifier B.

Figure 9:
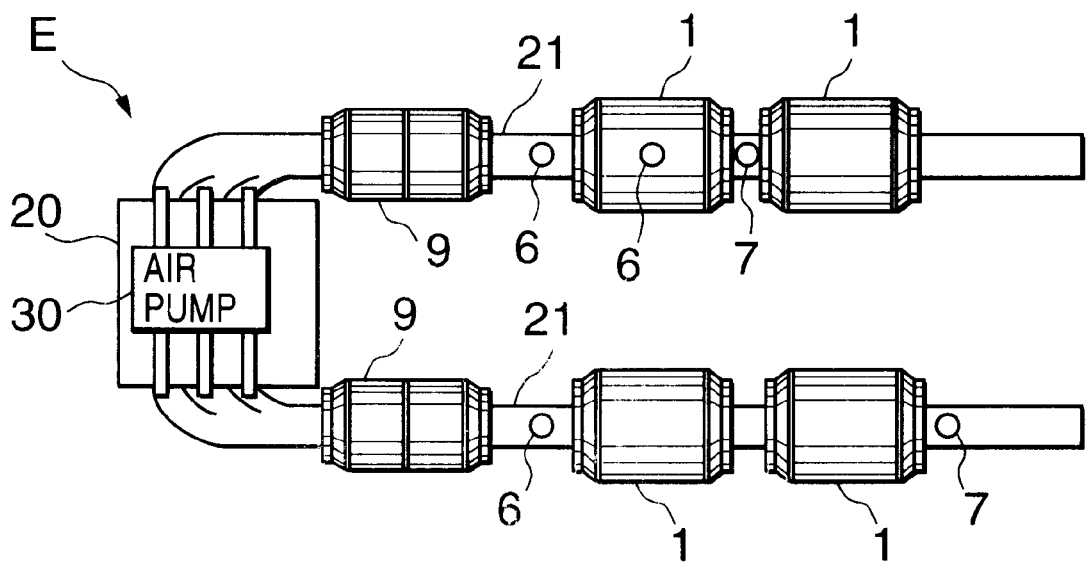
FIG. 9 is a schematic diagram of the exhaust purification device showing yet another variation of the fourth embodiment.

The exhaust gas purifier E of FIG. 9 is provided with a complex catalyst unit 9 instead of the three-way catalyst unit 10 of the device C.

In the complex catalyst unit 9, the three-way catalyst is provided in its upstream portion and the same unit as the catalyst unit 1 is provided in its downstream portion.

Figure 10:
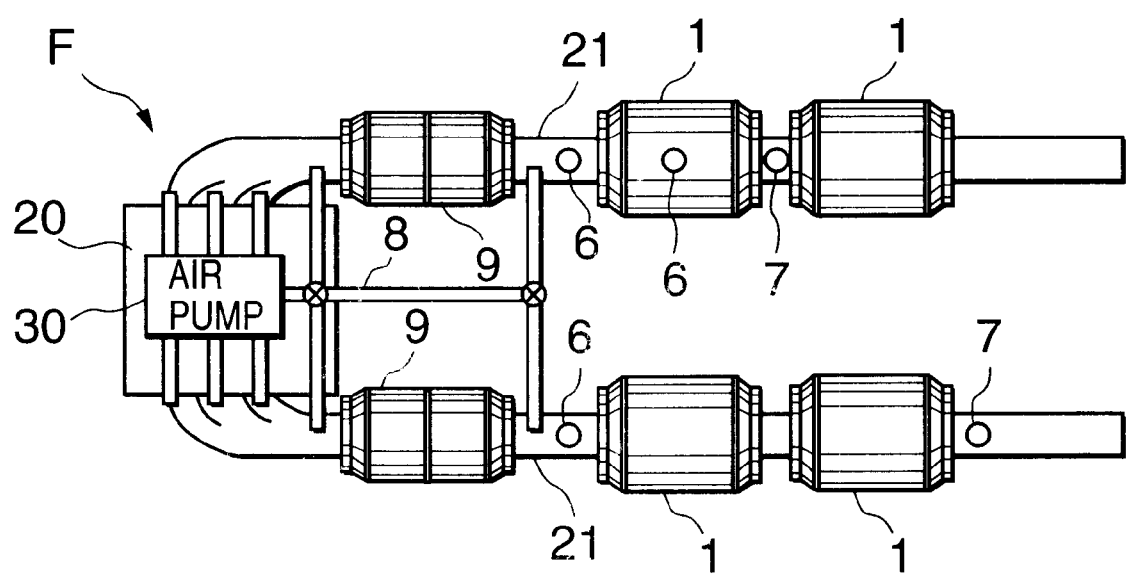
FIG. 10 is a schematic diagram of the exhaust purification device showing yet another variation of the fourth embodiment.

The exhaust gas purifier F of FIG. 10 is a combination of the purifier in the device E and the air pipe 8 of the device B.

The performance test was performed under the following conditions.

Catalyst capacity for one engine bank: Three-way catalyst unit 2.0 liter (1.0 liter+1.0 liter)+HC catalyst unit 1.3–2.6 liter Test vehicle: V type 6 cylinder 3.3 liter engine manufactured by Nissan Motor Co. Ltd.

Hydrocarbons discharged on engine startup (amount contained in catalyst inlet gas):
Carbon number: C2–C3 21.0%
C4–C6 33.0%
C7–C9 40.0%

From the tables of FIGS. 18–21, it is seen that the HC purification performance is higher for the Samples #35–#54 than for the Comparative Samples #15–#26.

The embodiments of this invention in which an exclusive property or privilege is claimed are defined as follows:

What is claimed is:

1. A catalyst unit for purifying the exhaust gas of an engine, comprising:
   a monolithic substrate having a Geometrical Surface Area in the range 10–35 $cm^2/cm^3$,
   a first layer comprising a zeolite hydrocarbon adsorbent formed on said monolithic substrate, and
   a catalyst layer comprising any one or palladium, platinum and rhodium as a three-way catalyst, said catalyst layer being formed on said first layer, and the weight ratio of said first layer to said catalyst layer lying in the range of 9:1 to 1:4.

2. A catalyst unit as defined in claim 1, wherein said zeolite comprises beta-zeolite.

3. A catalyst unit as defined in claim 2, wherein said beta-zeolite comprises H type beta-zeolite whereof the Si-2Al ratio is in the range of 10 to 500.

4. A catalyst unit as defined in claim 3, wherein said hydrocarbon adsorbent further comprises any one of MFI type zeolite, Y type zeolite, USY type zeolite, mordenite, ferrierite, A type zeolite, X type zeolite, $AlPO_4$ and SAPO.

5. A catalyst unit as defined in claim 2, wherein said hydrocarbon adsorbent further comprises any one of mordenite, Y type zeolite, USY type zeolite and MFI type zeolite in the range of 5 weight % to 45 weight %.

6. A catalyst unit as defined in claim 1, wherein said first layer further comprises any one of palladium (Pd), magnesium (Mg), calcium (Ca), strontium (Sr), barium (Ba), silver (Ag), yttrium (Y), lanthanum (La), cerium (Ce), neodymium (Nd), phosphorus (P), boron (B) and zirconium (Zr).

7. A catalyst unit as defined in claim 1, wherein said catalyst layer further comprises zirconium oxide which comprises 1–40 mole % of any one of rhodium (Rh), cerium (Ce), neodymium (Nd) and lanthanum (La) expressed as the metal.

8. A catalyst unit as defined in claim 1, wherein said catalyst layer further comprises alumina which comprises 1–10 mole % of any one of cerium (Ce), zirconium (Zr) and lanthanum (La) expressed as the metal, and cerium oxide which comprises 1–40 mole % of any one of zirconium (Zr), neodymium (Nd) and lanthanum (La) expressed as the metal.

9. A catalyst unit as defined it claim 1, wherein said catalyst layer comprises a second layer comprising palladium (Pd) as a three-way catalyst and a third layer formed on the second layer comprising rhodium (Rh) as a three way catalyst.

10. A catalyst unit as defined in claim 9, wherein said third layer further comprises 1–40 mole % of any one of cerium (Ce), neodymium (Nd) and lanthanum (La).

11. A catalyst unit as defined in claim 1, wherein said catalyst layer further comprises platinum (Pt).

12. A catalyst unit as defined in claim 1, wherein the weight ratio of said first layer and said catalyst layer is in the range of 5:1 to 1:2.

13. A catalyst unit as defined in claim 1, wherein said monolithic substrate comprises any one of an alkali metal and an alkaline earth metal.

14. A catalyst unit as defined in claim 1, wherein the number of cells of said monolithic substrate is set in the range of 50–600.

15. A catalyst unit as defined in claim 1, wherein the hydraulic diameter of said monolithic substrate is set in the range of 0.75–5 mm.

16. A catalyst unit as defined in claim 1, wherein the total thickness of said first layer and said catalyst layer is set in the range of 30–400 $\mu$m.

17. A catalyst unit as defined in claim 1, wherein the amount of hydrocarbon absorbed by said first layer is set equal to or less than 70% of the hydrocarbon saturation absorption amount.

18. A catalyst unit as defined in claim 1, wherein said hydrocarbon adsorbent further comprises any one of platinum palladium, phosphorus, boron, magnesium and calcium.

19. A catalyst unit as defined in claim 1, wherein said hydrocarbon adsorbent further comprises palladium, and said catalyst layer comprises a layer of cerium oxide comprising 1–40 mole % of any one of zirconium, neodymium and lanthanum expressed as the metal, and 60–98 mole % of cerium.

20. A catalyst unit as defined in claim 1, wherein said hydrocarbon adsorbent further comprises palladium, and said catalyst layer comprises a layer comprising zirconium oxide and active alumina, said zirconium oxide comprising 1–30 mole % of any one of platinum, rhodium, cerium, neodymium and lanthanum, and 70–98 mole % of zirconium.

21. An exhaust purification device for purifying the exhaust gas of an engine, comprising:
a first catalyst unit comprising a monolithic substrate having a Geometrical Surface Area in the range 10–35 cm$^2$/cm$^3$, a first layer comprising a zeolite hydrocarbon adsorbent formed on said monolithic substrate, and a catalyst layer comprising any one of palladium, platinum and rhodium as a first three-way catalyst, said catalyst layer being formed on said first layer, and the weight ratio of said first layer to said catalyst layer lying in the range of 9:1 to 1:4, and
a second catalyst unit installed upstream of said first catalyst unit, second catalyst unit supporting any one of palladium, platinum and rhodium as a second three-way catalyst, wherein a support concentration of said second three-way catalyst is set in the range of 4–20 weight %, and the support amount of said second three-way catalyst is set in the range of 100–1000 g/ft$^3$,
wherein the amount of hydrocarbon absorbed by said first layer is set equal to or less than 70% of the hydrocarbon saturation adsorption amount of said hydrocarbon adsorbent.

22. An exhaust purification device as defined in claim 21, wherein the concentration of said second three-was catalyst is set in the range of 4 weight % to 15 weight % and the support amount of said second three-way catalyst is set in the range of 100–500 g/ft$^3$.

23. An exhaust purification device as defined in claim 21, further comprising an ignition timing controller which retards an ignition timing of said engine by 1 to 30 degrees from top dead center for 40 seconds from engine startup.

24. An exhaust purification device as defined in claim 21, further comprising an air-fuel ratio controller which maintains an intake air amount of said engine at 10 liters/min or more and controls an air-fuel ratio of said engine to lie in the range of 12 to 18 for 60 seconds from engine startup.

25. An exhaust purification device as defined in claim 21, further comprising a mechanism for supplying either oxygen or air upstream of or inside said first catalyst unit immediately before hydrocarbons are desorbed from said hydrocarbon absorbent.

26. An exhaust purification device as defined in claim 25, further comprising a temperature sensor for detecting a temperature upstream of said first catalyst unit, an oxygen sensor for detecting an oxygen concentration in the exhaust gas downstream of said first catalyst unit, and a controller for controlling said mechanism so that the oxygen concentration detected by said oxygen sensor is equal to or greater than a value corresponding to a stoichiometric air-fuel ratio when the temperature detected by said temperature sensor is equal to or greater than a predetermined temperature.

27. An exhaust purification device as defined in claim 26, wherein said predetermined temperature is set to 100° C.

28. An exhaust purification device as defined in claim 25, further comprising a temperature sensor for detecting a temperature inside said first catalyst unit, an oxygen sensor for detecting an oxygen concentration in the exhaust gas downstream of said first catalyst unit, and a controller for controlling said mechanism so that the oxygen concentration detected by said oxygen sensor is equal to or greater than a value corresponding to a stoichiometric air-fuel ratio when the temperature detected by said temperature sensor is equal to or greater than a predetermined temperature.

29. An exhaust purification device as defined in claim 25, further comprising a first oxygen sensor for detecting an oxygen concentration in the exhaust gas upstream of said first catalyst unit, a second oxygen sensor for detecting an oxygen concentration in the exhaust gas downstream of said first catalyst unit, and a controller for determining desorption of hydrocarbons from said hydrocarbon absorbent based on the output of said first and second oxygen sensors, and controlling said mechanism so that the oxygen concentration detected by said second oxygen sensor is equal to or greater than a value corresponding to a stoichiometric air-fuel ratio during desorption of hydrocarbons.

30. An exhaust purification device as defined in claim 21, further comprising a catalyst unit identical to said first catalyst unit and installed downstream of said first catalyst unit.

31. An exhaust purification device for purifying the exhaust gas of an engine, comprising:
a first catalyst unit comprising a monolithic substrate having a Geometric Surface Area in the range 10–35 cm$^2$/cm$^3$, a first layer comprising a zeolite hydrocarbon adsorbent formed on said monolithic substrate, and a catalyst layer comprising rhodium as a first three-way, catalyst, said catalyst layer being formed on said first layer, and the weight ratio of said first layer to said catalyst layer lying in the range of 9:1 to 1:4, and
a second catalyst unit installed upstream of said first catalyst unit, said second catalyst unit supporting rhodium as a second three-way catalyst, wherein a support concentration of said second three-way catalyst is set in the range of 4–20 weight %, the support amount of said second three-way catalyst is set in the range of 100–1000 g/ft$^3$,
wherein the amount of hydrocarbon absorbed by said first layer is set equal to or less than 70% of the hydrocarbon saturation adsorption amount of said hydrocarbon adsorbent, and an amount of rhodium as the second three-way catalyst is set less than the amount of rhodium as the first three-way catalyst.

* * * * *